(12) United States Patent
Zhu et al.

(10) Patent No.: US 10,063,537 B2
(45) Date of Patent: Aug. 28, 2018

(54) PERMISSION ARCHITECTURE FOR REMOTE MANAGEMENT AND CAPACITY INSTANCES

(71) Applicant: Microsoft Technology Licensing, LLC, Redmond, WA (US)

(72) Inventors: Liqiang Zhu, Redmond, WA (US); Rajalakshmi Dani, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 14/970,773

(22) Filed: Dec. 16, 2015

(65) Prior Publication Data
US 2016/0182487 A1 Jun. 23, 2016

Related U.S. Application Data

(63) Continuation of application No. 14/714,789, filed on May 18, 2015, now Pat. No. 9,787,690.

(60) Provisional application No. 62/094,791, filed on Dec. 19, 2014.

(51) Int. Cl.
*H04L 29/06* (2006.01)

(52) U.S. Cl.
CPC ........ *H04L 63/083* (2013.01); *H04L 63/0823* (2013.01); *H04L 63/104* (2013.01); *H04L 63/105* (2013.01); *H04L 63/126* (2013.01)

(58) Field of Classification Search
USPC .......................................................... 726/9
See application file for complete search history.

(56) References Cited

U.S. PATENT DOCUMENTS

| | | | |
|---|---|---|---|
| 6,775,781 | B1 | 8/2004 | Phillips et al. |
| 6,922,784 | B2 | 7/2005 | Phillips et al. |
| 2003/0120526 | A1* | 6/2003 | Altman .................. G06Q 10/02 705/5 |
| 2008/0022368 | A1 | 1/2008 | Field et al. |
| 2010/0198730 | A1* | 8/2010 | Ahmed ............. G06F 17/30528 705/50 |
| 2010/0281173 | A1 | 11/2010 | Vutukuri et al. |
| 2011/0307947 | A1* | 12/2011 | Kariv ..................... H04L 63/08 726/9 |

(Continued)

FOREIGN PATENT DOCUMENTS

| | | |
|---|---|---|
| WO | 2009131646 A1 | 4/2009 |
| WO | 2009/131656 A2 | 10/2009 |

OTHER PUBLICATIONS

International Search Report and Written Opinion for International Patent Application No. PCT/US2015/066216, dated Mar. 18, 2016, date of filing: Dec. 17, 2015, 13 pages.

(Continued)

*Primary Examiner* — William J. Goodchild
(74) *Attorney, Agent, or Firm* — Christopher J. Volkmann; Kelly, Holt & Christenson, PLLC

(57) ABSTRACT

When a user inputs an action request, such as a requested command, to be performed on a target machine, a management system receives the request and verifies it with a separate authentication and permission system. The authentication and permission system verifies signatures on the request and signs it and generates an approved workflow package. The approved workflow package is sent to the target machine.

8 Claims, 27 Drawing Sheets

(56) References Cited

U.S. PATENT DOCUMENTS

| | | | |
|---|---|---|---|
| 2012/0096271 A1* | 4/2012 | Ramarathinam | ... H04L 63/0807 |
| | | | 713/172 |
| 2014/0157363 A1 | 6/2014 | Banerjee | |
| 2014/0282889 A1 | 9/2014 | Ishaya et al. | |
| 2014/0330969 A1 | 11/2014 | Duby et al. | |
| 2016/0182525 A1 | 6/2016 | Zhu et al. | |

OTHER PUBLICATIONS

International Search Report and Written Opinion for International Patent Application No. PCT/US2015/066352, dated Mar. 23, 2016, date of filing: Dec. 17, 2015, 11 pages.
Non-Final Office Action for U.S. Appl. No. 14/714,786 dated Nov. 18, 2016, 13 pages.
"Second Written Opinion Issued in PCT Application No. PCT/US2015/066216", dated Nov. 17, 2016, 7 Pages.
"Second Written Opinion Issued in PCT Application No, PCT/US2015/066352", dated Nov. 17, 2016, 6 Pages.
Notice of Allowance for U.S. Appl. No. 14/714,786 dated Jun. 7, 2017, 5 pages.
International Preliminary Report on Patentability for International Patent Application No. PCT/US2015/066352, dated Jan. 30, 2017, date of filing: Dec. 17, 2015, 7 pages.
International Preliminary Report on Patentability for International Patent Application No. PCT/US2015/066216, dated Feb. 7, 2017, date of filing: Dec. 17, 2015, 8 pages.
Amendment for U.S. Appl. No. 14/714,786 dated Feb. 20, 2017, 13 pages.

* cited by examiner

US 10,063,537 B2

PERMISSION ARCHITECTURE FOR REMOTE MANAGEMENT AND CAPACITY INSTANCES

CROSS-REFERENCE TO RELATED APPLICATION

The present application is a continuing application of, and claims priority of, U.S. patent application Ser. No. 14/714,786, filed May 18, 2015, and claims the benefit of U.S. provisional patent application Ser. No. 62/094,791, filed Dec. 19, 2014, the content of which is hereby incorporated by reference in its entirety.

BACKGROUND

Computer systems are currently in wide use. Some such computer systems are deployed in multi-tenant environments where a multi-tenant service provides services to multiple different tenants. Each tenant can correspond to a separate organization.

The level of services provided by the multi-tenant system can vary widely. For instance, they can range from infrastructure as a service (IaaS) in which items of infrastructure are managed by the service provider and everything else is managed by the individual tenants, to software as a service (SaaS) in which even the applications being used by the tenants are run and managed by the service provider.

Such systems can present difficulties with respect to security. Each organization served by the service provider wishes the service provider to have sufficient access to the organization's data so that the service provider can provide adequate service. However, the organizations also wish that security be provided so that the data of the organization is not compromised by any surreptitious attack on the service provider's management system.

Some current approaches to addressing this problem include performing background checks on administrative personnel who have standing, persistent administrative permissions within the system. Another approach has been to segregate access so that only certain administrative personnel have access to certain portions of the system.

The security problem can be exacerbated where the service provider is providing multi-tenant services on a multi-national basis. Some organizations may insist that only administrative personnel who reside in their country may have access to their information. Further, they may insist that all enforcement of security policies and permissions be executed by a system that resides within their country or jurisdiction.

The discussion above is merely provided for general background information and is not intended to be used as an aid in determining the scope of the claimed subject matter.

SUMMARY

When a user inputs an action request, such as a requested command, to be performed on a target machine, a management system receives the request and verifies it with a separate authentication and permission system. The authentication and permission system verifies signatures on the request and signs it and generates an approved workflow package. The approved workflow package is sent to the target machine. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
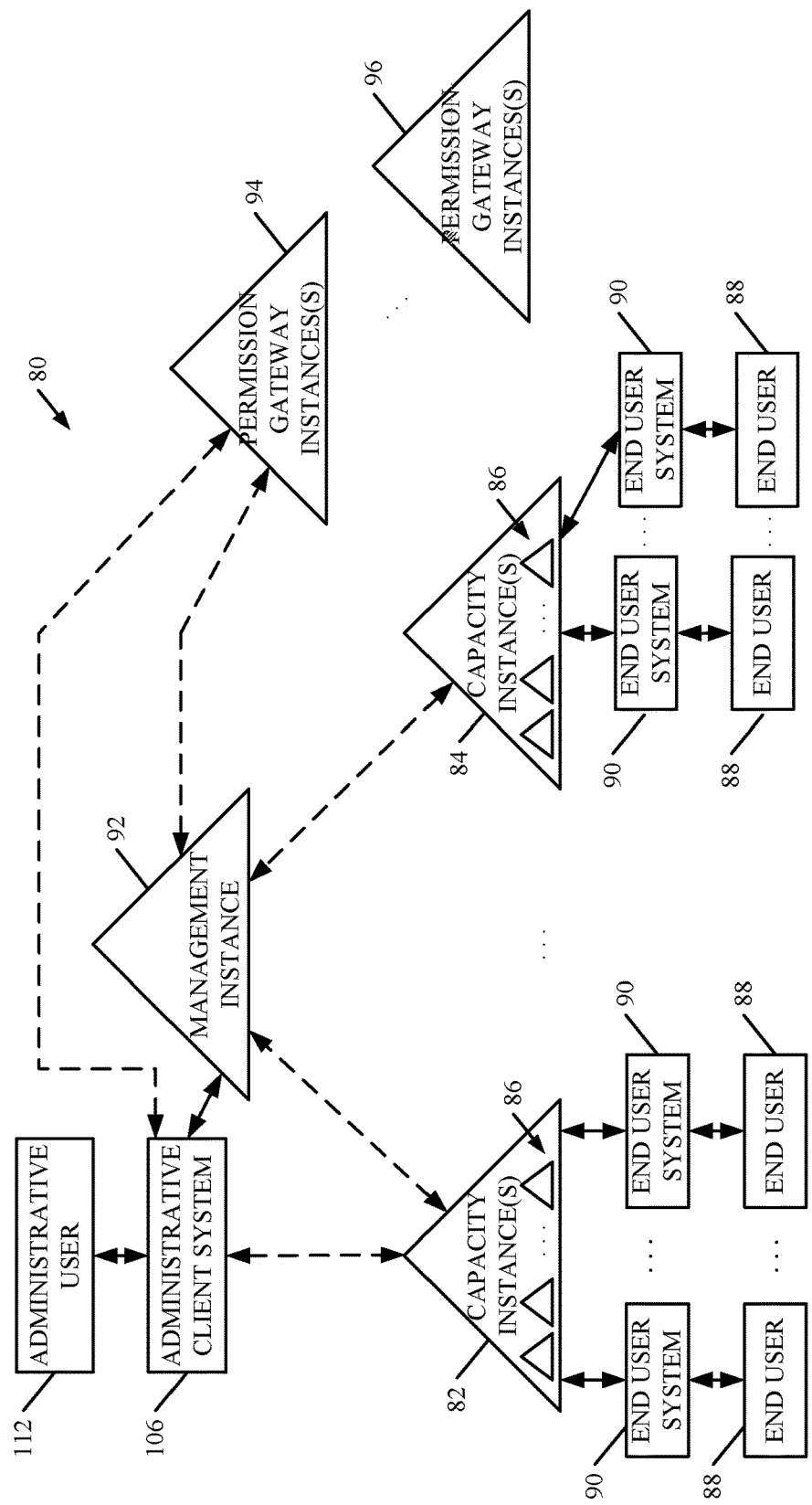
FIG. 1 shows one example of an overall authorization architecture.

FIG. 1 shows one example of an overall authorization architecture 80.

Architecture 80 shows that a plurality of capacity instances 82-84 can each be multi-tenant systems that serve a plurality of different tenant capacities 86. Each of the capacity instances 82-84 can be accessed by one or more end users 88 that correspond to the different tenants, through one or more end user systems 90. The capacity instances 82-84 are illustratively managed by a management instance 92. The management instance interacts with a permission gateway instance 94, which may, itself, interact with other permission gateway instances 96. In the architecture 80 shown in FIG. 1, an administrative user 97 can log into architecture 80 and be authenticated to perform various tasks or commands in management instance 92 or capacity instances 82-84 (or even individual tenant instances 86). In doing so, permission gateway instances 94-96 grant timebound and task-bound permissions, which can even grant permissions down to the individual data type.

An authentication component on each individual capacity instance 86 performs a claims-based enforcement. That is, it performs a final check as to whether a given administrative user is authorized to perform a task on a particular machine in the individual tenant capacity instances 86. The administrative user obtains a claim from a permission gateway instance 94-96 that is both signed and secure. The administrative user uses this claim to do work in the various capacity instances 82-84 and management instances 92. This is carried out in a way in which the administrative user is granted task-based privileges. The task-based privileges may be a least privileged environment needed to perform the tasks in a given command. This is described in greater detail below.

It will also be noted that a permission gateway instance can be used to support approvals for running substantially any workflows, even those of third parties. For example, one or more third party management instances can use permission gateway instances 94-96 to obtain permissions to perform workflows on one or more third party capacity instances 82-84. The management instance 92, permission gateway instances 94-96 and capacity instances 82-84 need not all be supported or run by the same party. One party may run and support permission gateway instances 94-96, while another party may run and support management instance 92 and capacity instances 82-84. Or all of the instances can be run and supported by separate parties. These and other architectures are contemplated herein.

Figure 1A:
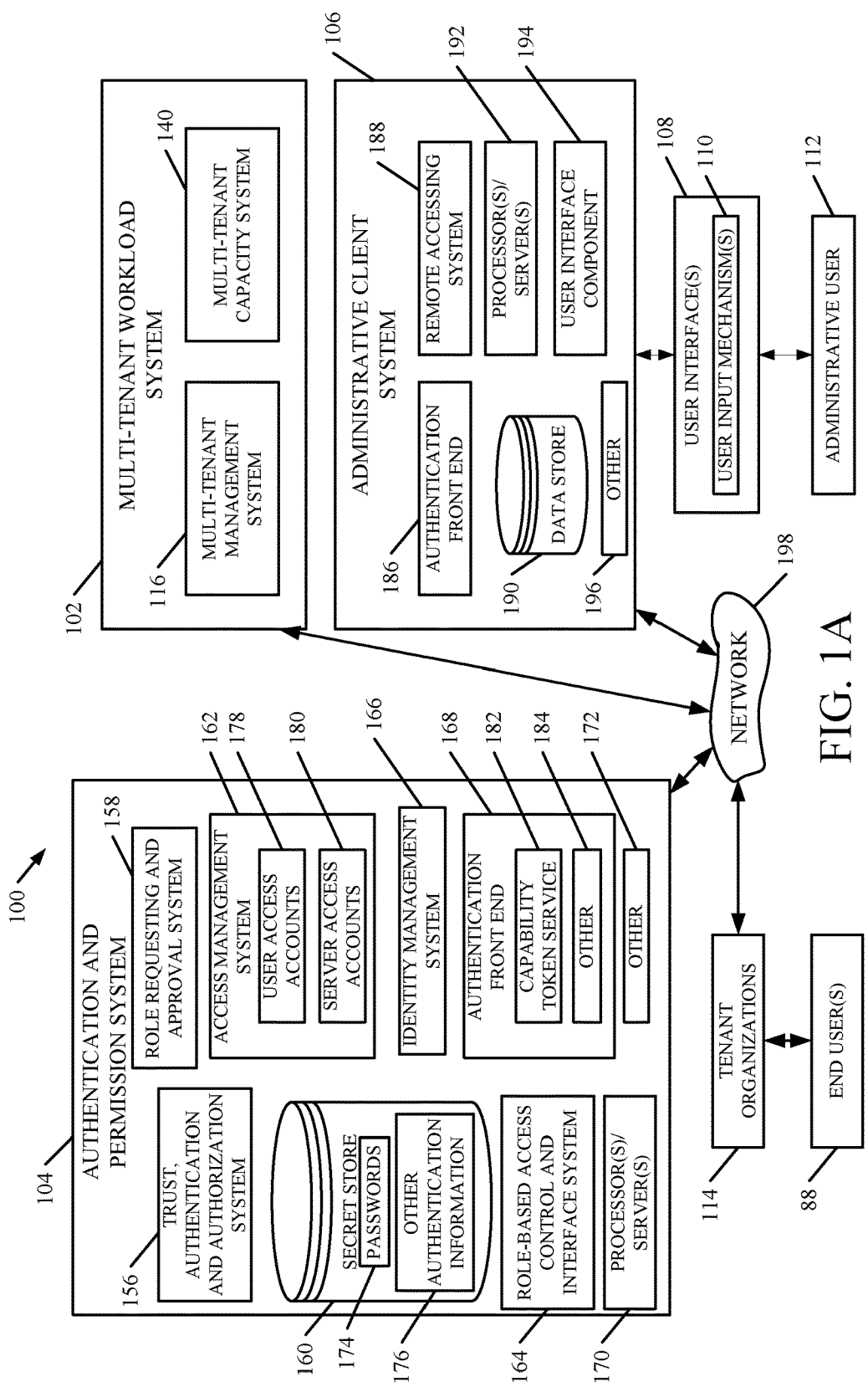
FIG. 1A is a block diagram of one example of an authentication and permission architecture.
Figure 1B:
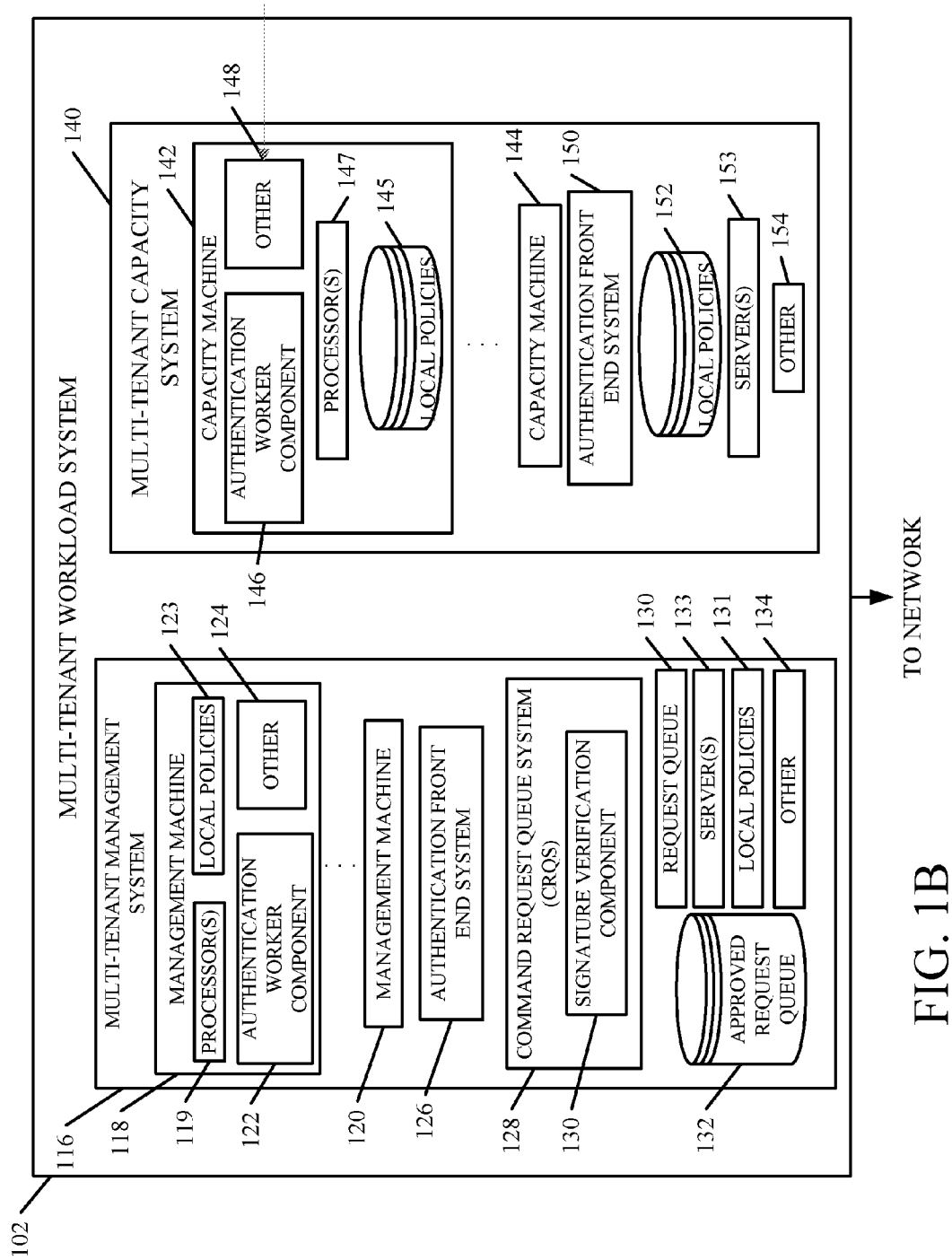
FIG. 1B is a block diagram showing a portion of FIG. 1A in more detail.
Figure 2A:
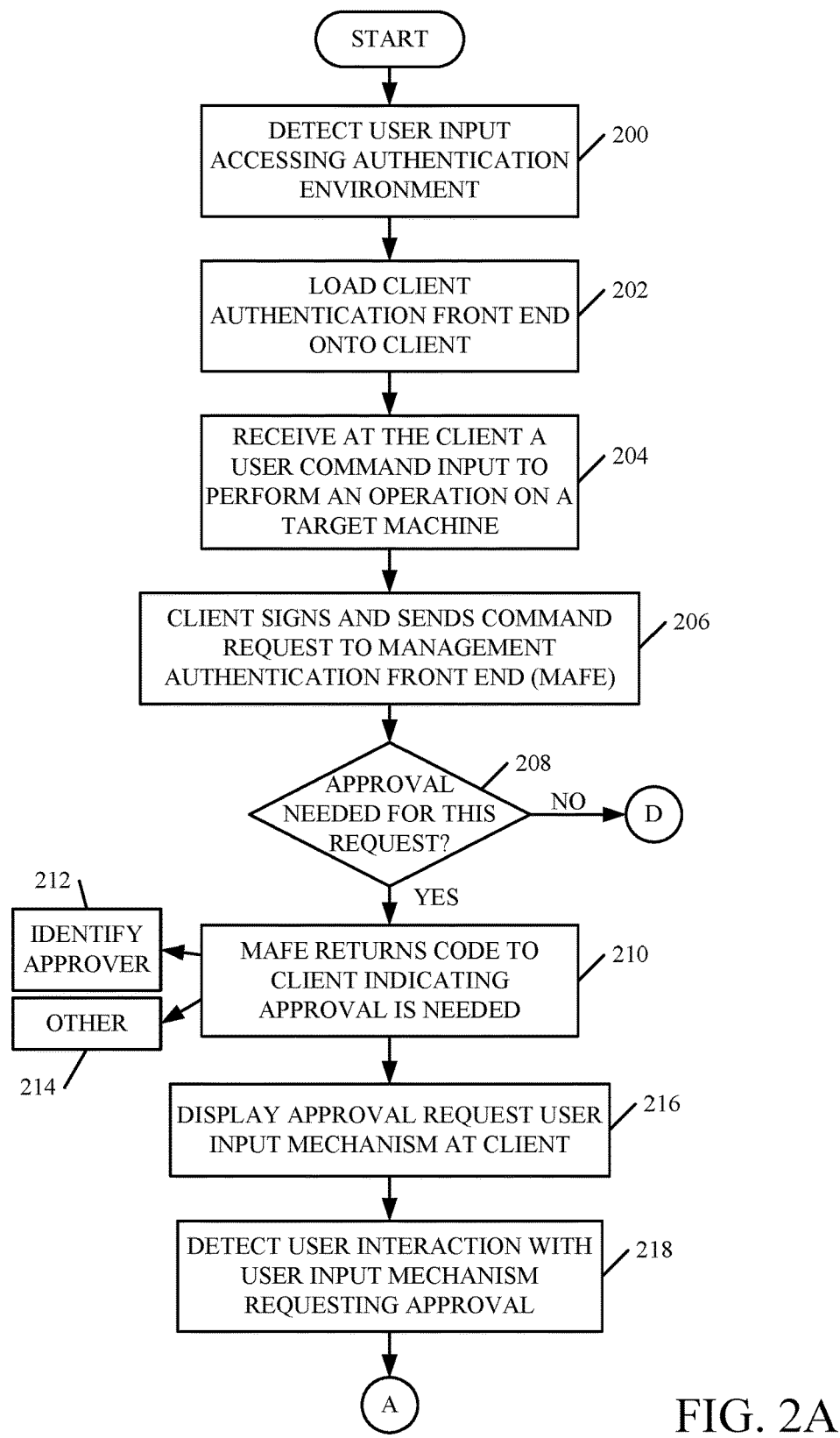
FIGS. 2A-2D (collectively referred to herein as FIG. 2) show a flow diagram illustrating one example of the overall operation of the architecture shown in FIG. 1.
Figure 2B:
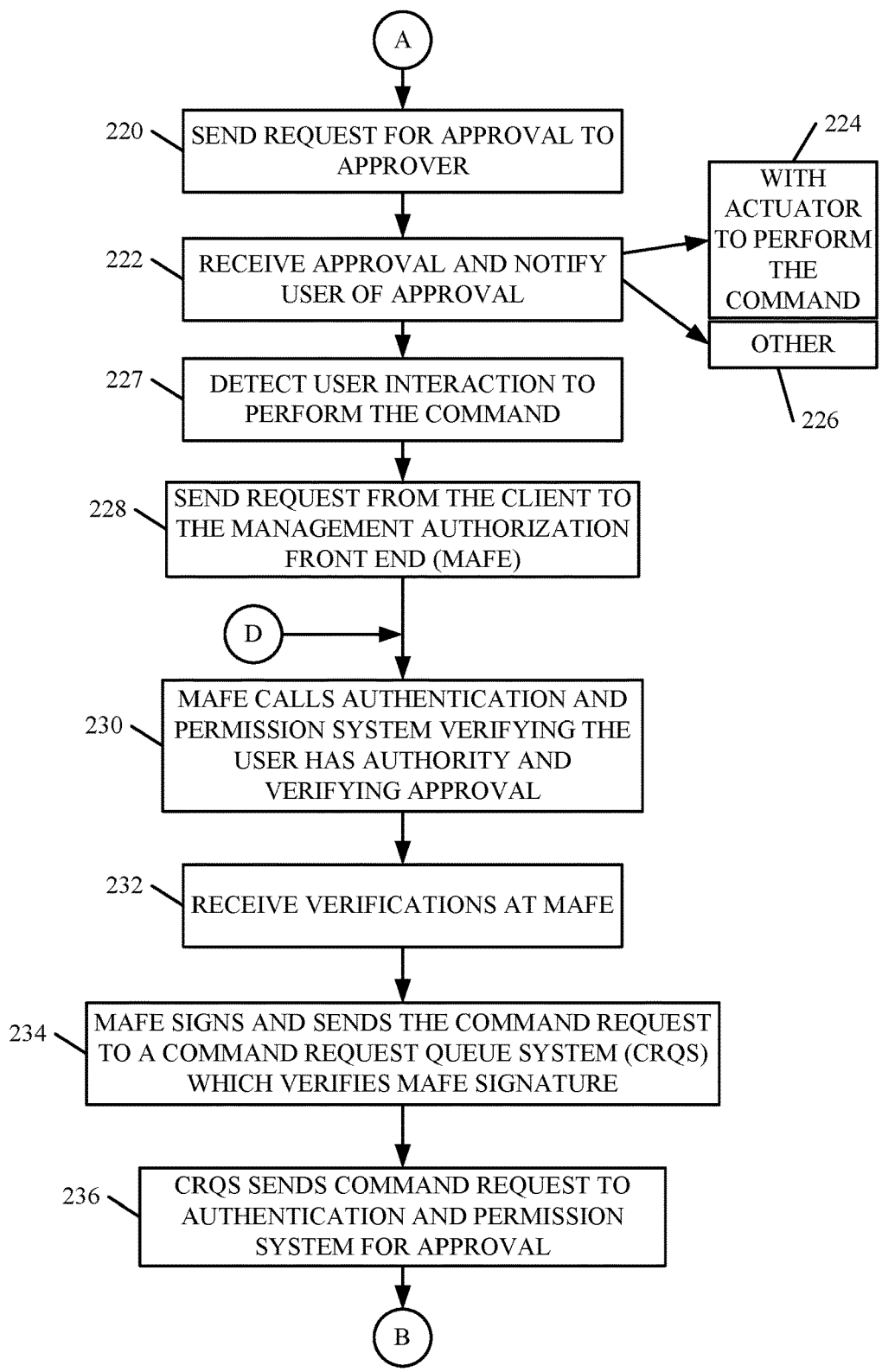
Figure 2C:
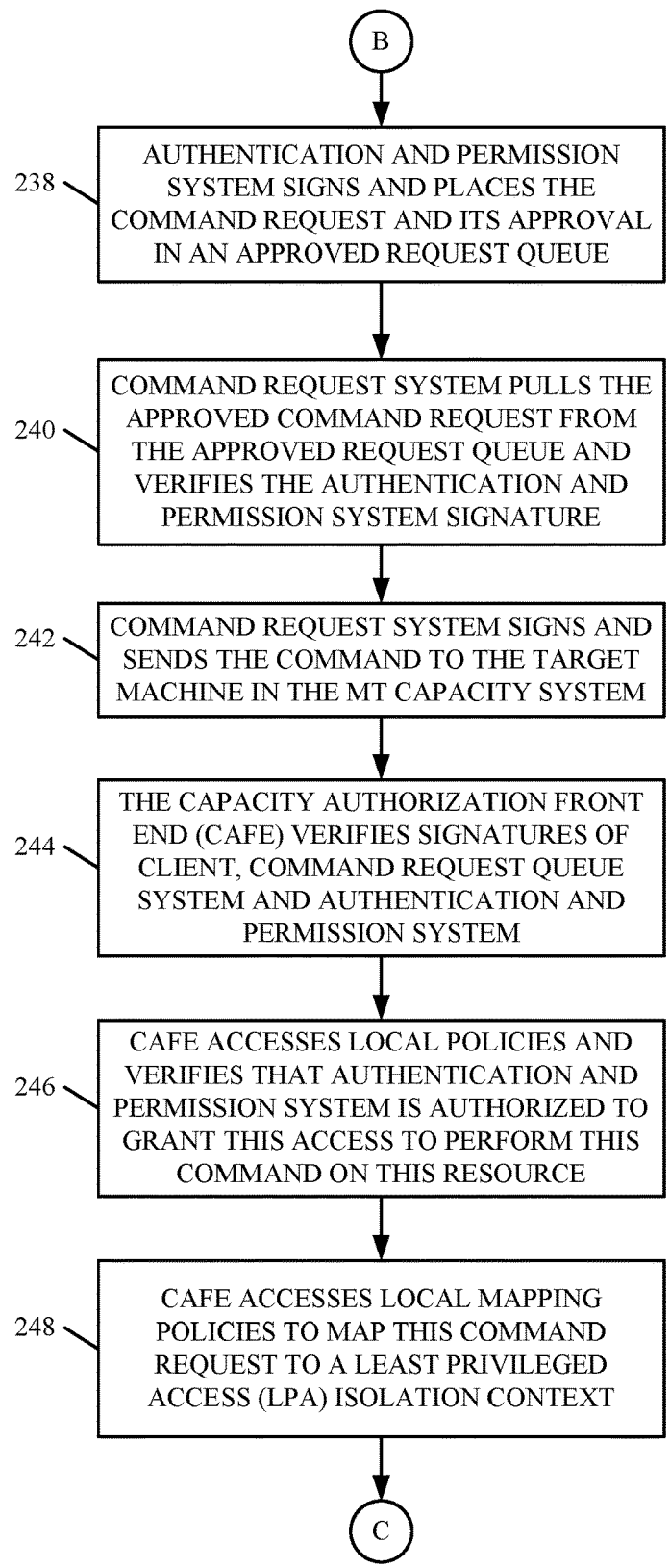
Figure 2D:
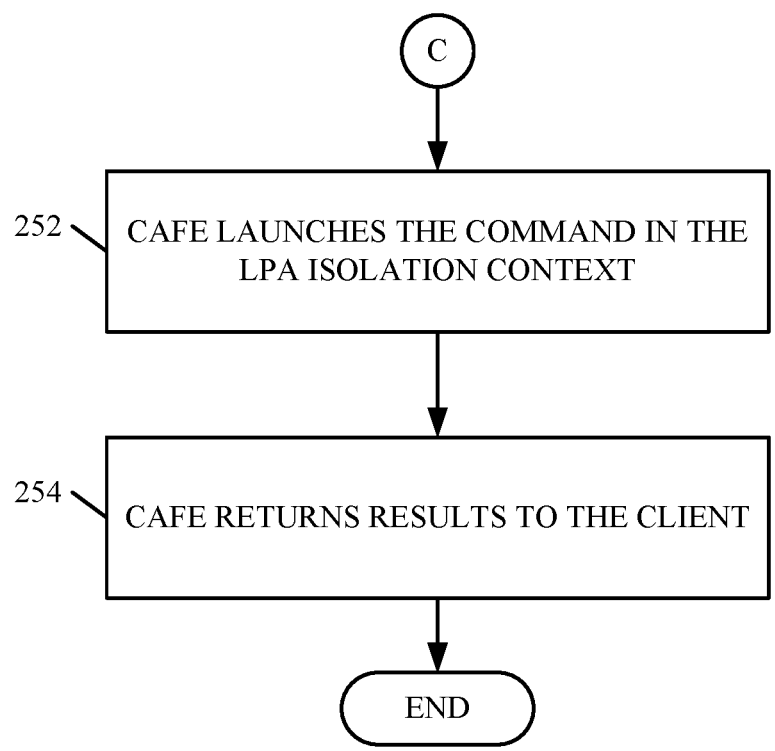

FIG. 1A is a block diagram of one example of an authentication and permission architecture 100 in more detail. Architecture 100 illustratively includes multi-tenant workload system 102, authentication and permission system 104, and one or more client systems 106. FIG. 1B shows the items in multi-tenant workload system 102 in more detail. FIGS. 1A and 1B will now be described in conjunction with one another.

Client system 106 is shown generating user interface displays 108 with user input mechanisms 110, for interaction by administrative user 112. In one example, user 112 is an administrative person (such as an on-call engineer or other administrative person) that interacts with user input mechanisms 110 to control and manipulate client system 106 so that user 112 can perform service operations within multi-tenant workload system 102. Multi-tenant workload system 102, itself, illustratively provides multi-tenant services to one or more tenant organizations 114. Tenant organizations 114, themselves, illustratively have end users 88 that use the information provided by multi-tenant workload system 102.

In the example shown in FIGS. 1A and 1B, multi-tenant workload system 102 illustratively includes a multi-tenant management system 116 (which can be a management instance 92 from FIG. 1) that enables user 112 to perform management operations within system 102. Multi-tenant management system 116, itself, includes one or more management machines 118-120. Each management machine illustratively includes one or more processors 119, an authentication worker component 122, local policies 123 and it can include other items 124. Multi-tenant management system 116 also illustratively includes an authentication front-end system 126, a command request queue system (CRQS) 128, a request queue 130, local policies 131, an approved request queue 132, one or more servers 133, and it can include other items 134. Command request queue system 128, itself, illustratively includes a signature verification component 138.

Multi-tenant workload system 102 also illustratively includes one or more multi-tenant capacity systems 140 (which can be capacity instances 82-84 or 86 from FIG. 1). It will also be noted that multi-tenant management system 116 can be separate from multi-tenant capacity systems 140, (as shown by instances 92 and 82-84 in FIG. 1). They are shown together in FIGS. 1A and 1B for the sake of example only. Each multi-tenant capacity system 140 illustratively includes one or more capacity machines 142-144 which, themselves, illustratively include an authentication worker component 146, local policies 145, processor 147 and can include other items 148. Multi-tenant capacity system 140 also illustratively includes authentication front-end system 150, a set of local policies 152, servers 153 and it can include other items 154.

Authentication and permission system 104 illustratively controls the granting of task-based permissions within architecture 100. In the example shown in FIG. 1A, it illustratively includes trust, authentication and authorization system 156, role requesting and approval system 158, secret store 160, access management system 162, role-based access control and interface system 164, identity management system 166, authentication front-end 168, processors and/or servers 170, and it can include other items 172. Secret store 160 illustratively includes passwords 174 and other authentication information 176. Access management system 162 can include user access accounts 178, and server access accounts 180. Authentication front-end 168 illustratively includes capability token service 182 and it can include other items 184.

Also, in the example shown in FIG. 1A, administrative client system 106 illustratively includes an authentication front-end 186, remote accessing system 188, data store 190, processors and/or servers 192 and, user interface component 194. It can include other items 196 as well.

In the example shown in FIG. 1A, the various components are shown communicating over network 198. It will be appreciated that network 198 can be a wide area network, a local area network, or it can include multiple different networks. It can include a wide variety of different network configurations.

Before describing the overall operation of architecture 100 in more detail, a brief overview of some of the items in architecture 100 will first be provided. Referring first to client system 106, authentication front-end 186 illustratively handles authentication and permission communications and operations that allow user 112 to be authenticated within architecture 100. Remote accessing system 188 illustratively allows user 112 to remotely access various machines in multi-tenant workload system 102 to perform administrative operations. User interface component 194 illustratively generates user interface displays 108 with user input mechanisms 110, and detects user interactions with mechanisms 110.

In multi-tenant management system 116 and multi-tenant capacity system 140, each authentication worker component 122 and 146, respectively, receives work items (such as commands or workflows) and identifies a task-based (e.g., least-privileged) execution environment for that work item. Components 122 and 146 illustratively execute the work items in the corresponding task-based execution environment. Components 122 and 146 can be embodied as a process running on each node in the multi-tenant workload system 102. Also, in one example, authentication worker components 122 and 146 can be installed on their respective machines in a secure way. For instance, components 122 and 146 can be received over the network, and a preboot execution environment can be maintained to boot the assemblies that embody component 122 and 146. In another example, field programmable gate arrays (FPGAs) on each machine can include security code or verification code that can be used to securely install and authenticate components 122 and 146. The assembly can be signed, as can verification code in the FPGAs. Therefore, as machines are put into, and taken out of, inventory, their security can be verified. Of course, this is one example only.

Authentication front-end system 126 in multi-tenant management system 116 illustratively handles the authentication communications with other items in architecture 100. For ease of reference, system 126 is also referred to herein as a management authentication front-end (MAFE) system 126. Request queue 130 receives command requests, and command request queue system (CRQS) 128 uses signature verification component 138 to verify the various signatures on the requested commands. It also communicates with authentication and permission system 104 to determine whether the requested command has been approved. If so, it places it in approved request queue 132.

In multi-tenant capacity system 140, authentication front-end system 150 illustratively handles the authentication communications with other components of architecture 100. Local policies 145 and 152 can be used by authentication front-end 150 and authentication worker components 146 to make a final verification that user 112 is, indeed, authorized to perform the requested command on the target machine within multi-tenant capacity system 140.

In authentication and permission system 104, trust, authentication and authorization system 156 employs a model that is based on certificates being used to identify users and services as well as to provide issuer signed capability tickets. This can include a public key infrastructure to deploy the certificate technology. This is described in greater detail below.

Role requesting and approval system 158 provides mechanisms for performing role requesting and approval of workflows. It also illustratively includes an enforcement engine that allows for membership to a role to be requested, approved, and then removed, as needed. Access management system 162 illustratively stores the user access accounts 178 and server access accounts 180 for any users that need to obtain access to any multi-tenant workload system 102 (or data center) which is governed by authentication and permission system 104. Identity management system 166 provides functionality that enables the configuration of the feeds that populate the user access accounts 178 and server access accounts 180 in access management system 162. It performs identity-related tasks, such as provisioning (e.g., creating and updating), entitlements on user accounts, such as group memberships and account attributes, etc. These entitlements can be used to drive access control within the service. Role-based access control and interface system 164 illustratively provides interfaces for authoring, storing and validating role membership and permission queries. It can be integrated with role requesting and approval system 158 to provide the functionality for making role membership require a request and approval, and for making role membership limited to a specific amount of time. It is shown separately for the sake of example only.

Secret store 160 illustratively stores passwords 174 and other types of secret information used for authenticating a user 112 in architecture 100. Authentication front-end 168 illustratively includes a capability token service 182. It illustratively provides functionality for users and services to request capability tokens for authentication and authorization as will be described in great detail below.

For purposes of the present description, a network topology exists among the items in architecture 100. In one example, the authentication front-end system 150 in multi-tenant capacity system 140 trusts information received from authentication front-end system 126 in multi-tenant management system 116. MAFE system 126, in turn, trusts information received from authentication front-end 168 in authentication and permission system 104. In one example, this trust relationship is transitive. Therefore, authentication front-end system 150 trusts authentication front-end 168 by way of its trust in MAFE system 126.

Before describing the various components in greater detail, one example of a runtime scenario will first be described, as an overview, in order to enhance understanding. FIGS. 2A-2D (collectively referred to herein as FIG. 2) show a flow diagram illustrating one example of a runtime scenario in which user 112 wishes to perform an administrative operation on a target machine in multi-tenant capacity system 140. For purposes of the present example, it will be assumed that user 112 wishes to perform an administrative operation on capacity machine 142.

In one example, user interface component 194 on client system 106 first detects a user interaction or input indicating that the user wishes to access an authentication environment (e.g., the authentication architecture 100 shown in FIG. 1). This is indicated by block 200. Detecting user input accessing the authentication environment can include enforcing smart card authentication, entering a personal identification number (e.g., PIN), among other things Client system 106, in response, loads client authentication front-end 186 into client 106. It can be loaded in the form of a client console application used to authenticate and authorize user 112 to perform actions, or in other ways. This is indicated by block 202.

Remote accessing system 188 illustratively generates user interface displays with user input mechanisms that allow user 112 to provide a command input indicative of a command or operation that the user wishes to perform on target machine 142. It then detects user interaction with that user input mechanism. The user interaction illustratively identifies a particular command that the user is requesting to perform. Receiving the user command input is indicated by block 204 in FIG. 2.

Authentication front-end 186 illustratively signs the requested command and sends it to MAFE 126 in multi-tenant management system 116. Signing and sending the command request from client 106 to MAFE system 126 is indicated by block 206 in FIG. 2. MAFE system 126 illustratively determines whether the user 112 needs manual approval (such as approval from the user's manager) in order to perform the request. This is indicated by block 208. If not, processing skips to block 230 described below.

However, if, at block 208, MAFE system 126 determines that user 112 needs manual approval, then it returns code to authentication front-end 186 in client system 106 indicating this. This is indicated by block 210. The code will also illustratively identify the particular approver that needs to approve the request. This is indicated by block 212. It can include other items as well, and this is indicated by block 214.

Client system 106 illustratively displays an approval request user input mechanism to user 112. The display will illustratively indicate that the user 112 needs to have approval from his or her manager (or other approver) to perform the requested command, and it will include a user input mechanism that the user can actuate to initiate the approval process. Displaying the approval request user input mechanism at client 106 is indicated by block 216 in FIG. 2. User interface component 194 then detects user interaction with (e.g., actuation of) the user input mechanism, indicating that user 112 wishes to initiate the approval process. This is indicated by block 218 in FIG. 2.

In response, client system 106 illustratively sends a request for approval to the identified approver. For instance, this can be an email to the approver, along with a user input mechanism that can be actuated by the approver, in order to approve the request. Sending the request for approval is indicated by block 220 in FIG. 2. When the approver (e.g., the manager) interacts with the user input mechanism approving the request, a notification is sent back to client system 106 to notify user 112 that he or she has been approved to perform the requested command. Receiving the approval and notifying the user of the approval is indicated by block 222. The notification to the user may, itself, include a user input mechanism that can be actuated for the user to again initiate a request to perform the command, now that it has been approved. Displaying the notification with such an actuator is indicated by block 224. The notification can be performed in other ways as well, and this is indicated by block 226.

User interface component 194 then detects user interaction with the user input mechanism, indicating that the user wishes to perform the command. This is indicated by block 227.

Authentication front-end 186 in client system 106 then sends the request to perform the command from client system 106 to MAFE system 126. This is indicated by block 228 in FIG. 2. MAFE system 126, in turn, calls authentication and permission system 104 (and illustratively trust, authentication and authorization system 156) to verify that the user has the authority to perform the requested command on the target machine, and also verifying that the user has received approval from the user's manager (if applicable). This is indicated by block 230. Trust, authentication and authorization system 156 verifies this and returns a verification to MAFE system 126. This is indicated by block 232 in FIG. 2.

Once verifications have been received from trust, authentication and authorization system 156, MAFE system 126 signs the command request and places it in queue 130 for access by command request queue system (CRQS) 128. CRQS 128 retrieves the command request from queue 130 and uses signature verification component 138 to verify the signature of MAFE system 126. This is indicated by block 234 in FIG. 2.

CRQS 128 then sends the command request to authentication and permission system 104 for approval. Authentication front-end 168 (and particularly capability token service 182) generates a capability token or approval ticket for the command request. It signs the command request and places the command request and its approval ticket in an approved request queue 132 in multi-tenant management system 116. Sending the command request to system 104 for approval is indicated by block 236 in FIG. 2, and approving, signing, and placing the command request in approved request queue 132 is indicated by block 238.

CRQS 128 then pulls the approved command requests from the approved request queue 132, in order. Once an approved command request is pulled off of queue 132, signature verification component 138 verifies the signature of the authentication and permission system 104 on the approved command request. This is indicated by block 240.

It then signs and sends the command request to target machine 142 in multi-tenant capacity system 140. This is indicated by block 242.

The authentication front-end system 150 verifies the signatures of client 106, command request queue system 128 and authentication and permission system 104, and sends the command request to authentication worker component 146. This is indicated by block 244. Authentication worker component 146 then accesses local policies 145 and verifies that the authentication and permission system 104 is authorized to grant this access to perform this command request on this particular resource. This is indicated by block 246. When this has been confirmed, component 146 then accesses mappings in local policies 145 that map this particular command request to a task-based (e.g., least privileged) access isolation context (or a least privileged execution environment) on the target machine 142. This is indicated by block 248. Authentication worker component 146 then launches the command in the task-based access isolation context on target machine 142. This is indicated by block 250. It then returns results of the executed command to client system 106. This is indicated by block 254.

It will be noted that, in one example, there may be a plurality of each of the multi-tenant capacity system 140, the multi-tenant management system 116 and the authentication and permission system 104 and they can be located in geographically disparate locations. They can have identifiers that identify their locations to the other systems. The policies implemented by each system may indicate which system, in which geographic location, is to be used in generating the various authentications and permissions. Each system may also have a plug-in to receive various different policies to be employed in granting authentications and permissions. The different systems thus illustratively, work seamlessly with one another, regardless of where they are located.

Figure 3A:
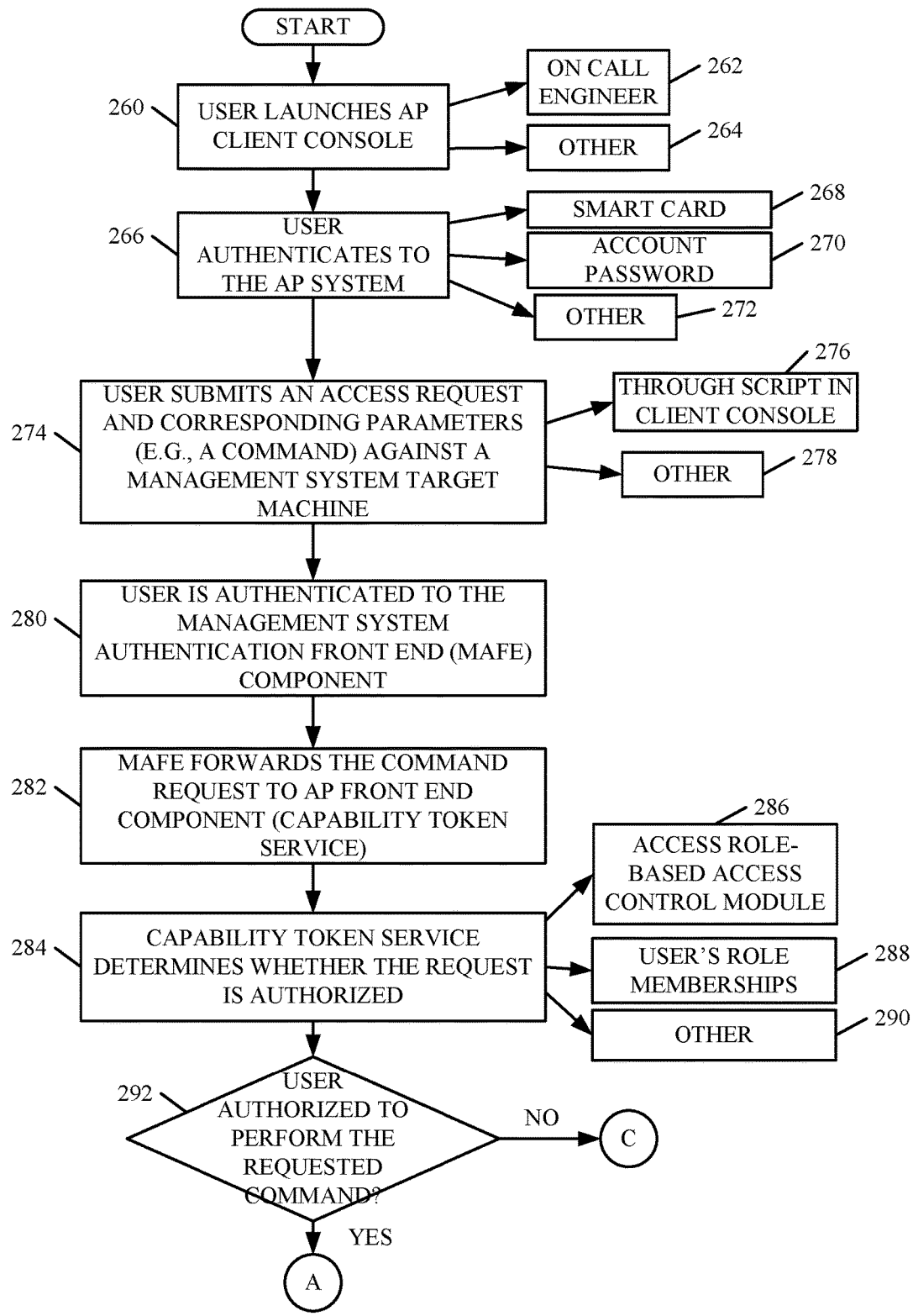
FIGS. 3A-3C (collectively referred to herein as FIG. 3) illustrate a flow diagram of example of the operation of the architecture shown in FIG. 1, in more detail.
Figure 3B:
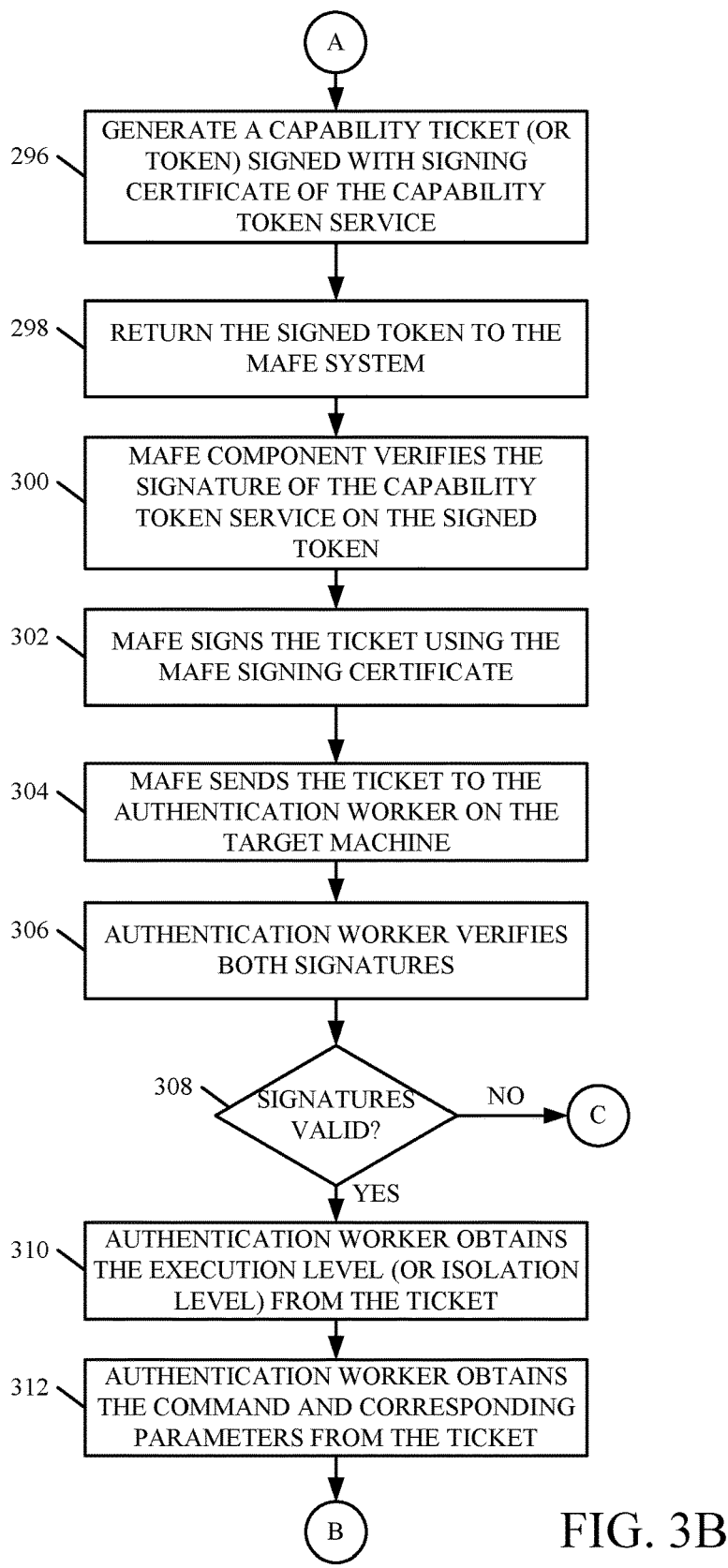
Figure 3C:
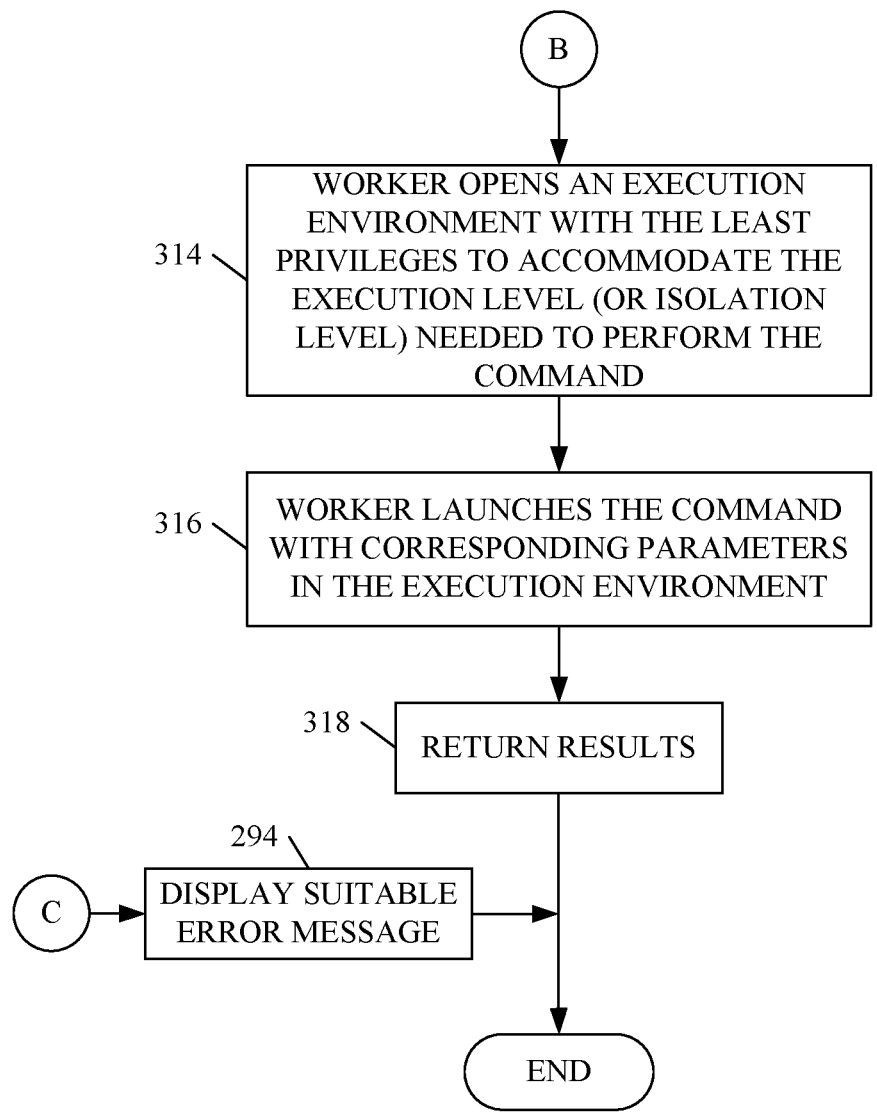

In some examples architecture 100 can use a computer network authentication protocol which works on the basis of tickets (or tokens). These tokens allow nodes communicating over a non-secure network to prove their identity to one another in a secure manner, without a public key infrastructure. It can be used in a client-server architecture and provides mutual authentication. Both the client and server verify each other's identity. It uses a trusted third party and can optionally include public key cryptography. Thus, client system 106 can use this to authenticate to systems 102 and 104. FIGS. 3A-3C (collectively referred to herein as FIG. 3) show a flow diagram illustrating one example of the operation of architecture 100 using this type of authentication in executing a command against a target machine (e.g., machine 118) in multi-tenant management system 116.

In the example discussed in FIG. 3, the user 112 first provides inputs indicating that the user wishes to launch authentication front-end 186. This can be launched as a client console, or in other ways. This is indicated by block 260. For instance, in one example, the user may wish to log into the system as an on-call engineer (or OCE). This is indicated by block 262. Of course, the user can provide an input indicating that he or she wishes to launch authentication front-end 186 in other ways as well, and this is indicated by block 264.

The user then authenticates to authentication and permission system 104. This is indicated by block 266. Authentication and permission system 104 may also be referred to herein as AP system 104. In one example, authentication front-end 186 enforces a two-factor authentication with AP system 104. It can, for instance, enforce smart card authentication as indicated by block 268, account password authentication as indicated by block 270, or other authentication as indicated by block 272. Once the user is signed in, the user can submit an access request (e.g., a command and corresponding parameters) against a target machine (e.g., management machine 118) in multi-tenant management system 116. This is indicated by block 274. The user can illustratively do this through a script that is running on the client console that forms authentication front-end 186. This is indicated by block 276. The user can submit the command in other ways as well, and this is indicated by block 278.

In response, the user is then authenticated to MAFE system 126. This is indicated by block 280 in the flow diagram of FIG. 3. In one example, AP system 104 authenticates the user to multi-tenant management system 116. This can be done in a wide variety of ways. In one example, it can be done using a computer network authentication protocol that works on the basis of tickets to allow systems 104 and 116, communicating over an unsecure network 198, to prove their identity to one another in a secure manner. In such an example, client system 106 and multi-tenant management system 116 verify each other's identity using AP system 104 as a trusted third party.

Once the authentication is complete, MAFE system 126 forwards the command requested by user 112 to authentication front-end 168, and, in one example, to capability token service 182. This is indicated by block 282 in FIG. 3.

Capability token service 182 illustratively determines whether the command request is authorized. This is indicated by block 284. For instance, it can do so by accessing role-based access control and interface system 164. This is indicated by block 286. That is, it can access system 164 to determine whether the user is authorized to perform the command, based upon the user's role memberships. This can also involve a risk analysis. A risk metric can be calculated based on what is currently happening in system 102, based on the user profile for the particular user 112 who is making the request, based on the system profile for the system where the command is to be performed, among other things. For example, if the requesting user 112 is not normally a user who would be making such a request, or if the request is being made at an unusual time (such as a very busy time or when the user 112 is on vacation, etc.), then this may indicate that this is a relatively high risk command. The system 164 illustratively considers various factors and calculates a risk metric indicative of the risk corresponding to the requesting user 112 performing the requested command on the target resources (or target machine) at this time and under these circumstances. Verifying whether the user is authorized to perform the command based on the user's role memberships is indicated by block 288. The user can be verified in other ways as well, and this is indicated by block 290.

If, at block 292 it is determined that the user is not authorized to perform the requested command, then processing skips to block 294 where a suitable error message is displayed. However, if, at block 292, it is determined that the user is authorized to perform the requested command, then processing moves to block 296 where capability token service 182 generates a capability ticket (or token) that may include the risk metric and signs it with a signing certificate corresponding to the capability token service 182 (or authentication front-end 168). It then returns the signed ticket or token to MAFE system 126. This is indicated by block 298 in FIG. 3.

In response, MAFE system 126 verifies the signature of authentication front-end 168 (or capability token service 182) on the signed token. This is indicated by block 300. MAFE system 126 then signs the ticket (or token) using its own signing certificate and sends the ticket (or token) to authentication worker component 122 on the target machine 118. This is indicated by blocks 302 and 304, respectively.

After receiving the signed ticket (or token), authentication worker component 122 verifies both signatures (of either authentication front-end 168 or token service 182, as well as MAFE system 126) to determine whether they are valid. If the signatures are not valid, as determined at block 308, then again processing reverts to block 294 where an error message is displayed. However, if, at block 308, the signatures are valid, then authentication worker component 122 obtains an execution level (or isolation level) from the ticket (or token). This is indicated by block 310. For instance, in one example, authentication worker component 122 accesses local policies 123 to identify a map that maps individual commands (or sets of commands) to sets of privileges and permissions (or other items that characterize an execution environment of isolation level) in the target machine 118.

Authentication worker component 122 then unpacks the command and its corresponding parameters from the ticket (or token). This is indicated by block 312. It then opens a task-based execution environment (e.g., an execution environment with the least amount of privileges or permissions that are needed to accommodate the execution level, or isolation level, that is needed to perform the command) This is indicated by block 314. It will be noted that, while in one example the least privileges and permissions are used, that may not always be the case. For instance, in another example, there may be slightly more permissions or privileges granted in the execution environment than are absolutely needed. However, the privileges and permissions are determined based upon the particular command that is to be performed. As described above, one example is that the least number of permissions and privileges needed to perform the command are granted.

Authentication worker component 122 then launches the command, with the corresponding parameters, in the execution environment that has just been opened. This is indicated by block 316. When the command has been performed, component 122 can then return results to client system 106. This is indicated by block 318.

Before describing the key architecture, the mappings between command requests and execution environments will first be described. As briefly discussed above, the local policies 145 can include mappings. The mappings illustratively map various different command requests (or workflows) to various different execution environments. Each execution environment is illustratively the least privileged execution environment needed to perform the command request (or workflow). The mappings can be created in a wide variety of different ways.

Figure 3D:
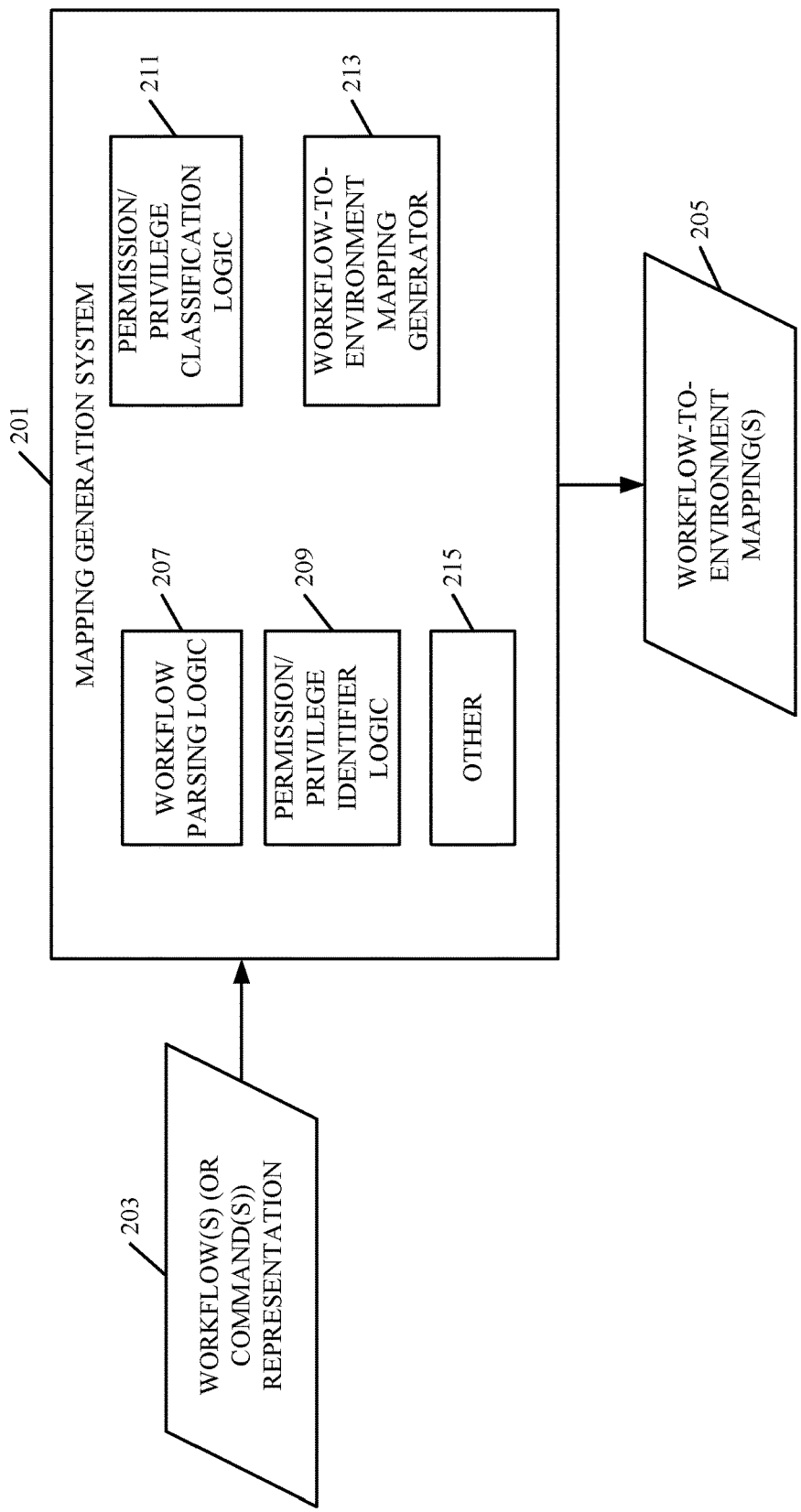
FIG. 3D is a block diagram of one example of a mapping generation system that maps workflows (or command requests) to an execution environment.
Figure 3E:
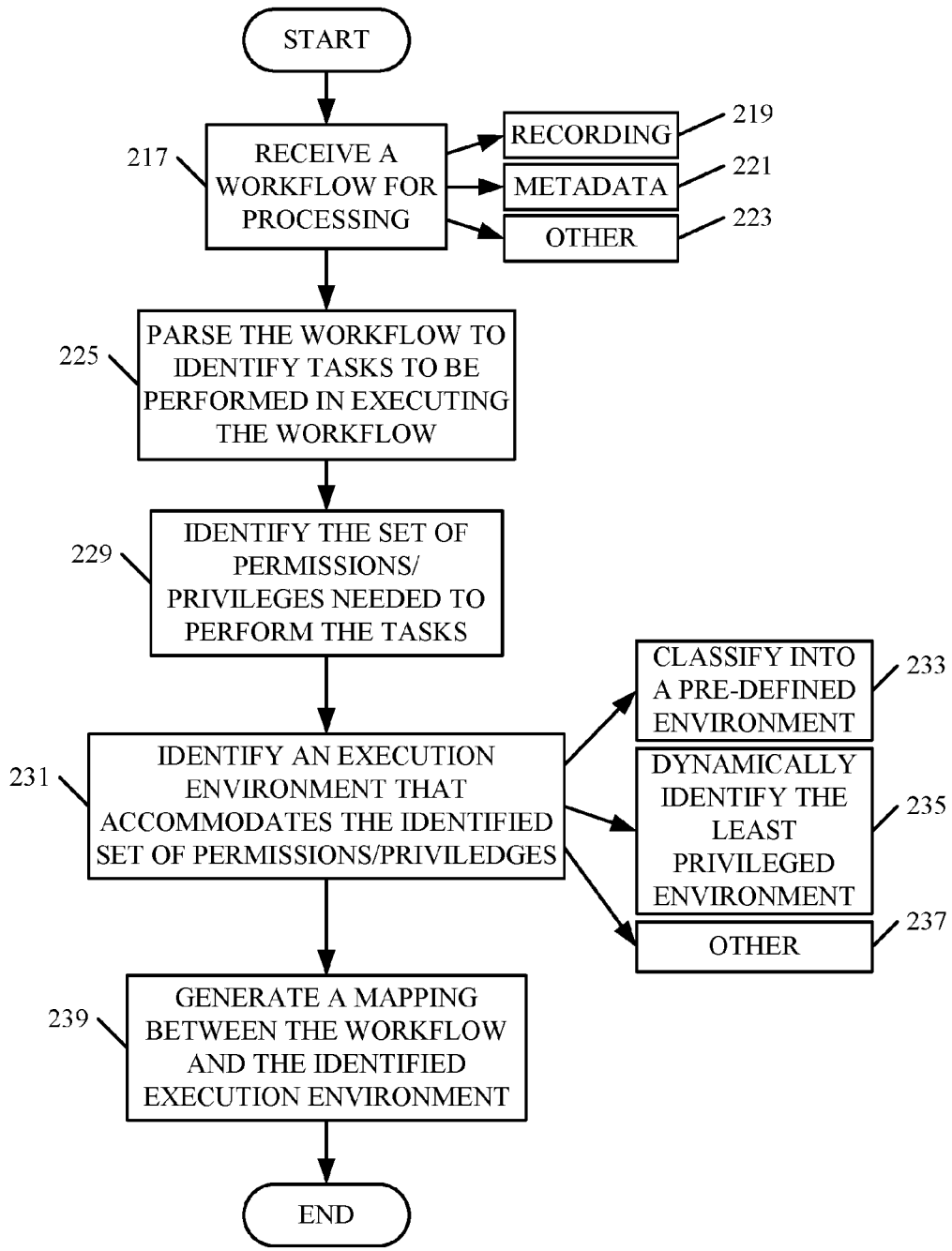
FIG. 3E is a flow diagram showing one example of the operation of the system shown in FIG. 3D.

As briefly mentioned above, mappings between command requests (or workflows) and execution environments can be used to identify the execution environment, and corresponding privileges that are needed to perform a command or workflow. In one example, the workflow is mapped to the least privileged execution environment that can be used to perform the workflow. In another example, each workflow is mapped to an execution environment that, while not the least privileged needed to execute the workflow, is limited in privileges. In this way, a plurality of different workflows that need similar (although not identical) privileges can be grouped together. Each group can then be mapped to an execution environment that has sufficient privileges so that each workflow in the corresponding group can be performed. The mappings can be generated in a variety of different ways. FIG. 3D is a block diagram of one example of a mapping generation system 201 that can be used to automatically receive a representation of a workflow 203 and generate a mapping 205 from that workflow 203 to an execution environment (which may be defined by a collection of privileges or otherwise). FIG. 3E is a flow diagram showing one example of the operation of system 201. FIGS. 3D and 3E will now be described in conjunction with one another.

System 201 illustratively includes workflow parsing logic 207, permission/privilege identifier logic 209, permission/privilege classification logic 211, workflow-to-environment mapping generator 213, and it can include other items 215. System 201 first receives a representation of one or more workflows 203, for mapping. This is indicated by block 217 in FIG. 3E. The representation 203 can take a wide variety of different forms. For instance, it may be a recording 219 of an administrator performing the workflow. It may be a metadata description 221 of the workflow or it may be another representation 223.

Workflow parsing logic 207 then parses the representation 203 to identify the various steps or tasks that are used in performing the workflow. This is indicated by block 225. In doing so, logic 207 may identify different parts of the capacity instance (or any other instance or machine) that are to be touched or accessed during execution of the workflow. This may be indicated by metadata or it may be learned using machine learning or identified programmatically or in other ways.

Permission/privilege identifier logic 209 then identifies a superset of the privileges and/or permissions that are needed to perform the steps or tasks in the workflow or workflows under analysis. This is indicated by block 229 in FIG. 3E.

Based on the identified privileges/permissions, classification logic 211 identifies an execution environment that accommodates the identified set of privileges/permissions. This is indicated by block 231. In doing so, logic 211 may classify the set of privileges/permissions into one of a plurality of pre-defined execution environments. This is indicated by block 233. The execution environment will illustratively have sufficient privileges/permissions so the tasks or steps can be executed. In one example, logic 211 can be dynamically identify a new execution environment as the least privileged environment for executing the tasks or steps in the workflow. This is indicated by block 235. The execution environment can be identified in other ways as well. This is indicated by block 237.

Workflow-to-environment mapping generator 213 then generates a mapping between the workflow or workflows under analysis and the identified execution environment. This is indicated by block 239. The mapping can be output or stored for use during runtime. It can be saved to one or more locations, or output in other ways.

Figure 4A:
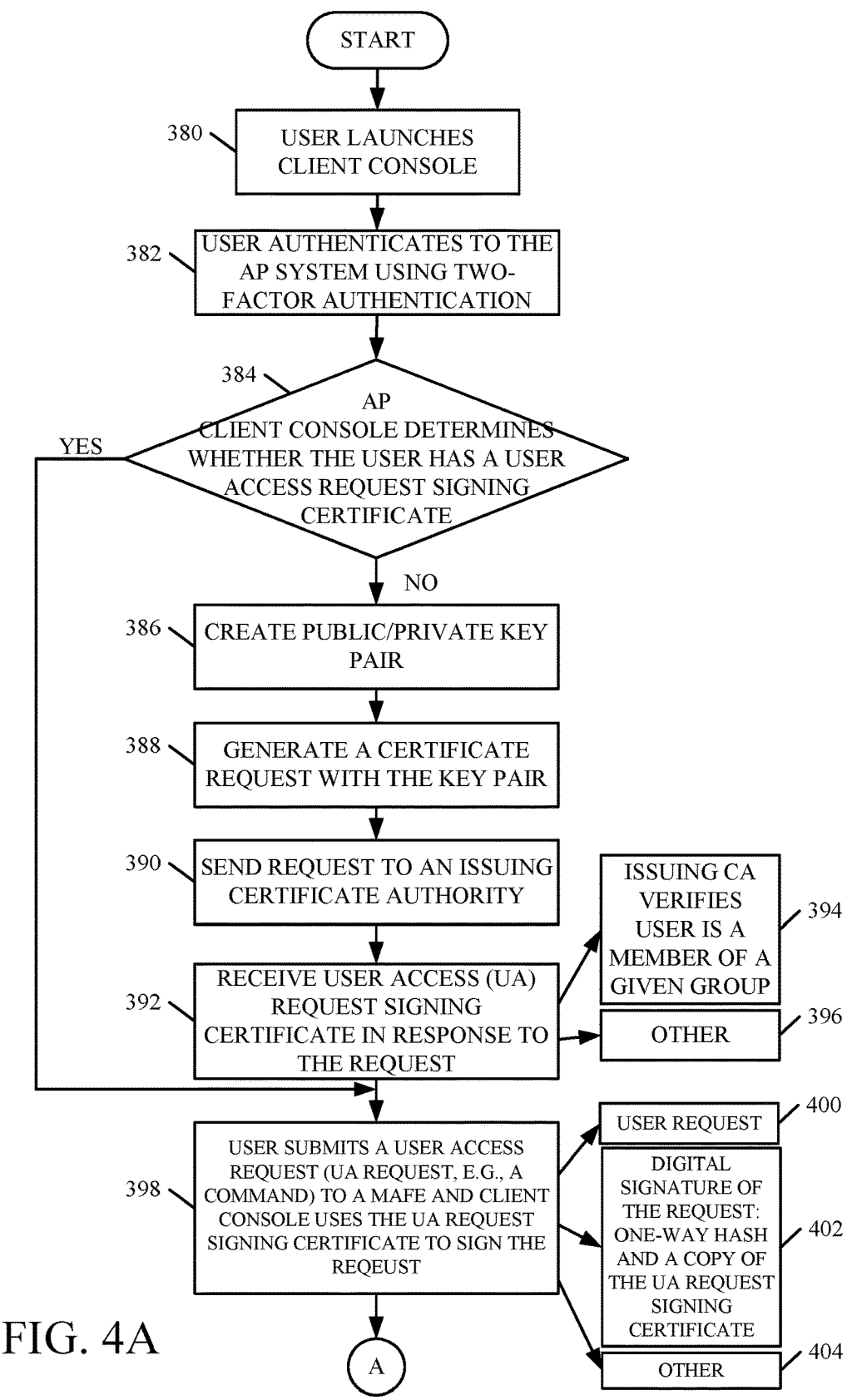
FIGS. 4A-4C (collectively referred to herein as FIG. 4) show another example of the operation of the architecture shown in FIG. 1, in which a public key infrastructure is used.
Figure 4B:
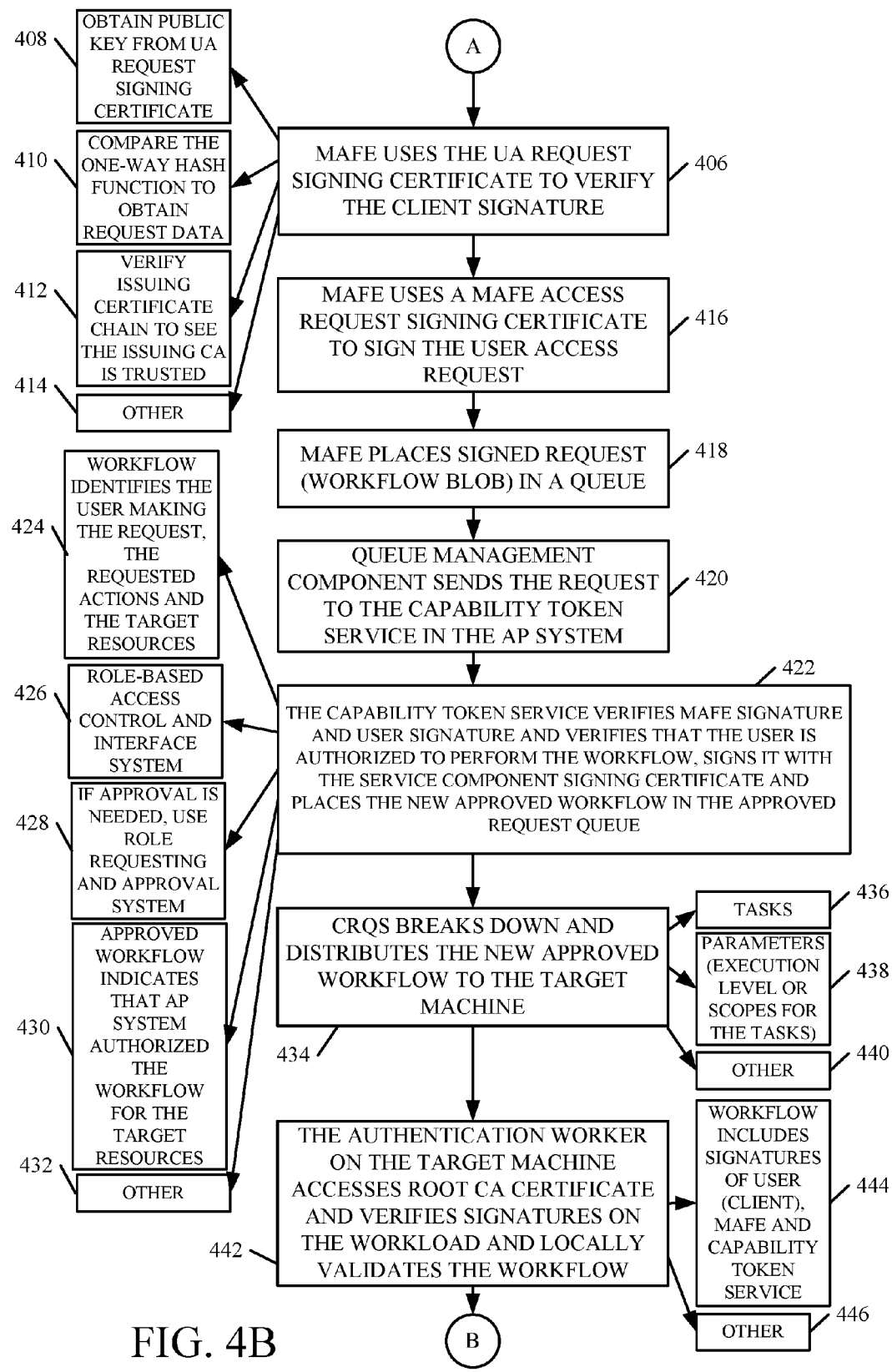
Figure 4C:
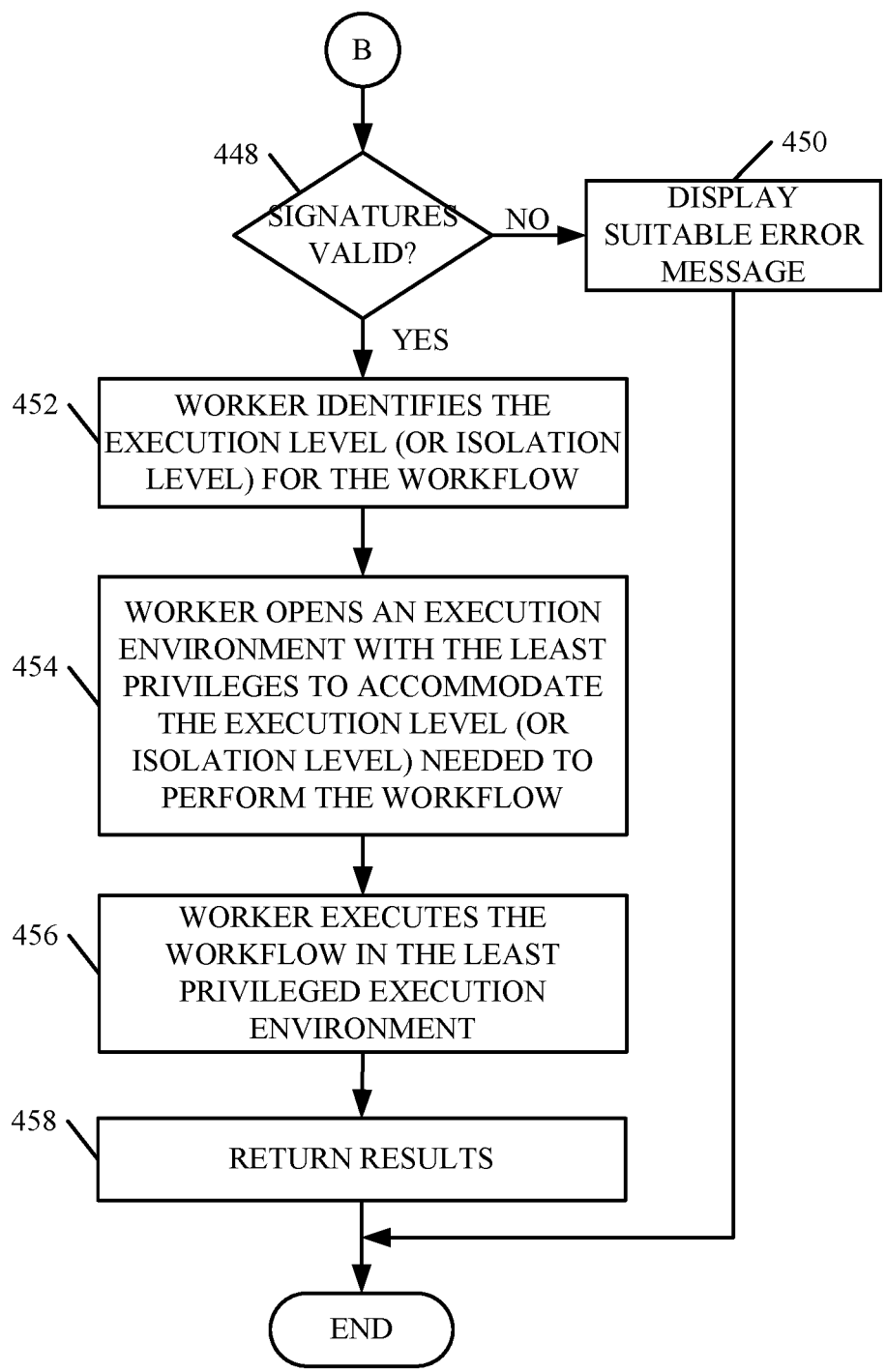

FIGS. 4A-4C (collectively referred to herein as FIG. 4) illustrate one example of the operation of architecture 100 in allowing user 112 to be authenticated to perform a command (or other task) on a target machine, where trust, authentication and authorization system 156 uses a public key infrastructure. FIGS. 4D-4G show a number of items illustrated in FIGS. 1A and 1B, in more detail.

Figure 4D:
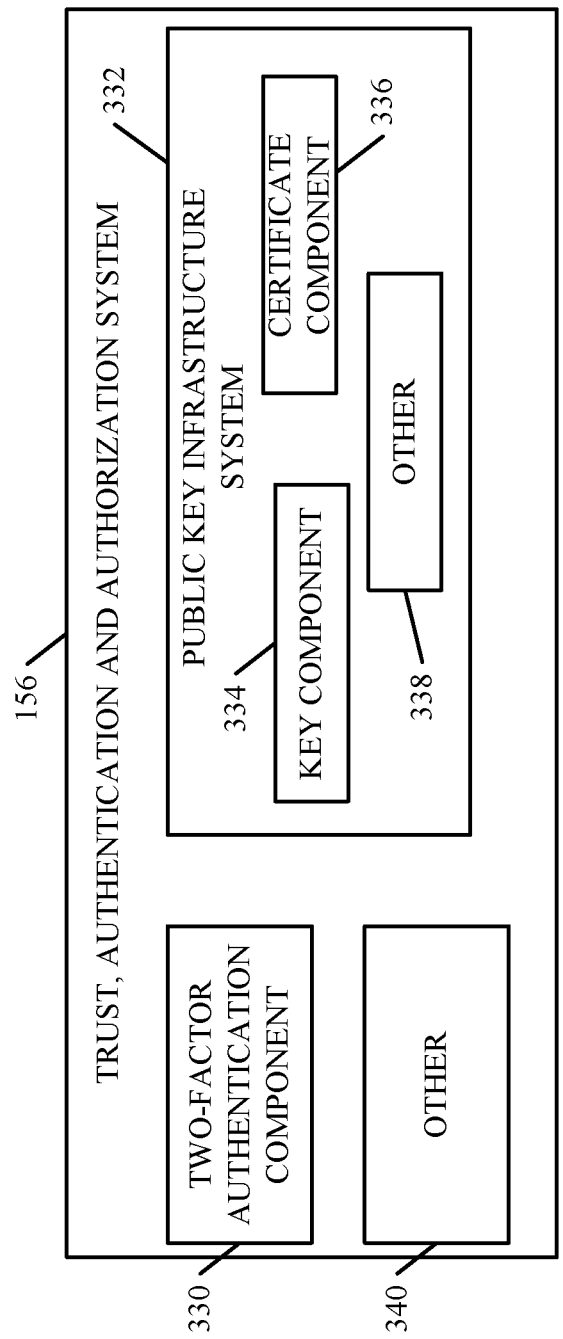
FIGS. 4D-4G are block diagrams showing a number of items illustrated in FIGS. 1A and 1B, in more detail.

FIG. 4D, for instance, shows one example of trust, authentication and authorization system 156 in more detail. FIG. 4D shows that system 156 can include two-factor authentication component 330, public key infrastructure system 332 (which, itself, can include key component 334, certificate component 336, and other items 338), and system 156 can include other items 340 as well.

Figure 4E:
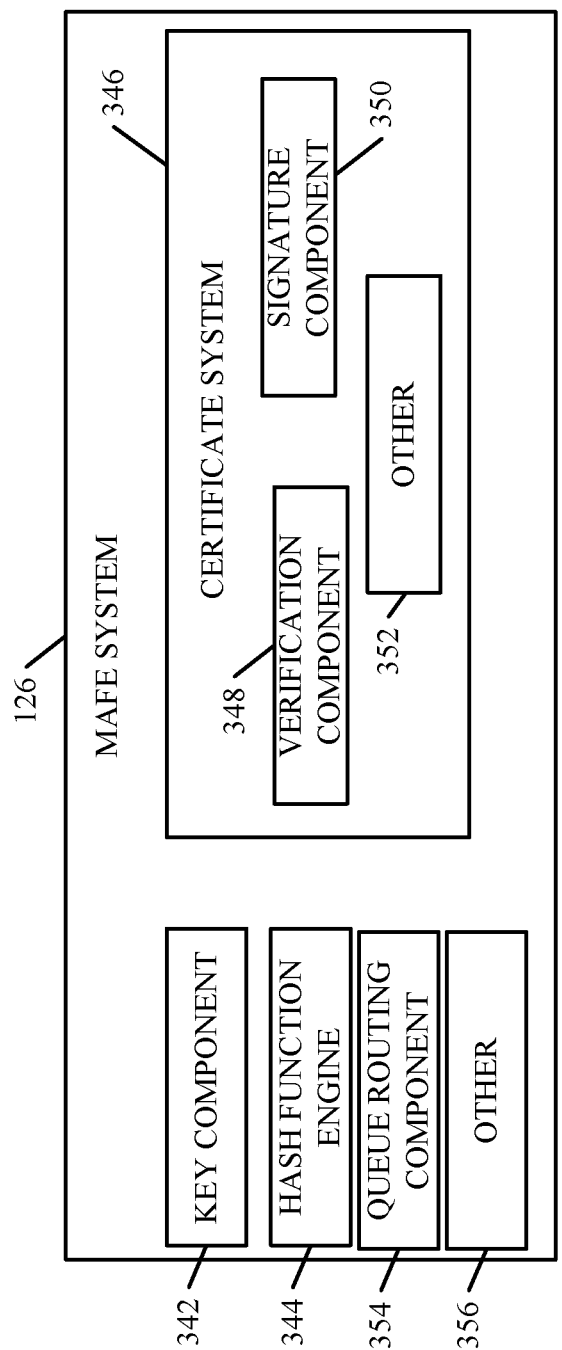

FIG. 4E illustrates one example of MAFE system 126 in more detail. FIG. 4E shows that MAFE system 126 can include key component 342, hash function engine 344, certificate system 346 (which, itself, can include verification component 348, signature component 350, and other items 352), queue routing component 354, and it can include other items 356.

Figure 4F:
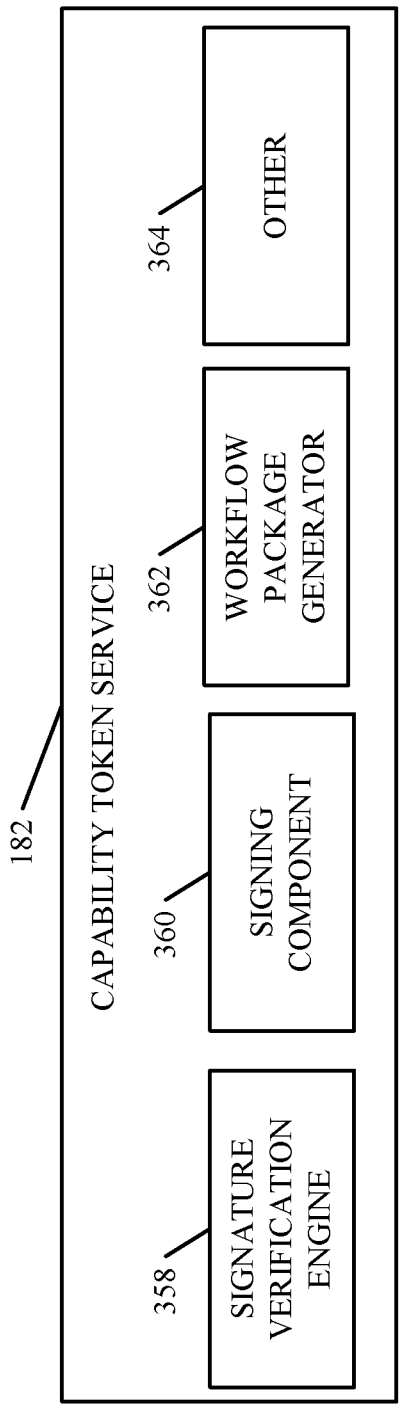

FIG. 4F shows one example of capability token service 182 in more detail. In the example shown in FIG. 4F, service 182 illustratively includes signature verification engine 358, signing component 360, workflow package generator 362, and it can include other items 364.

Figure 4G:
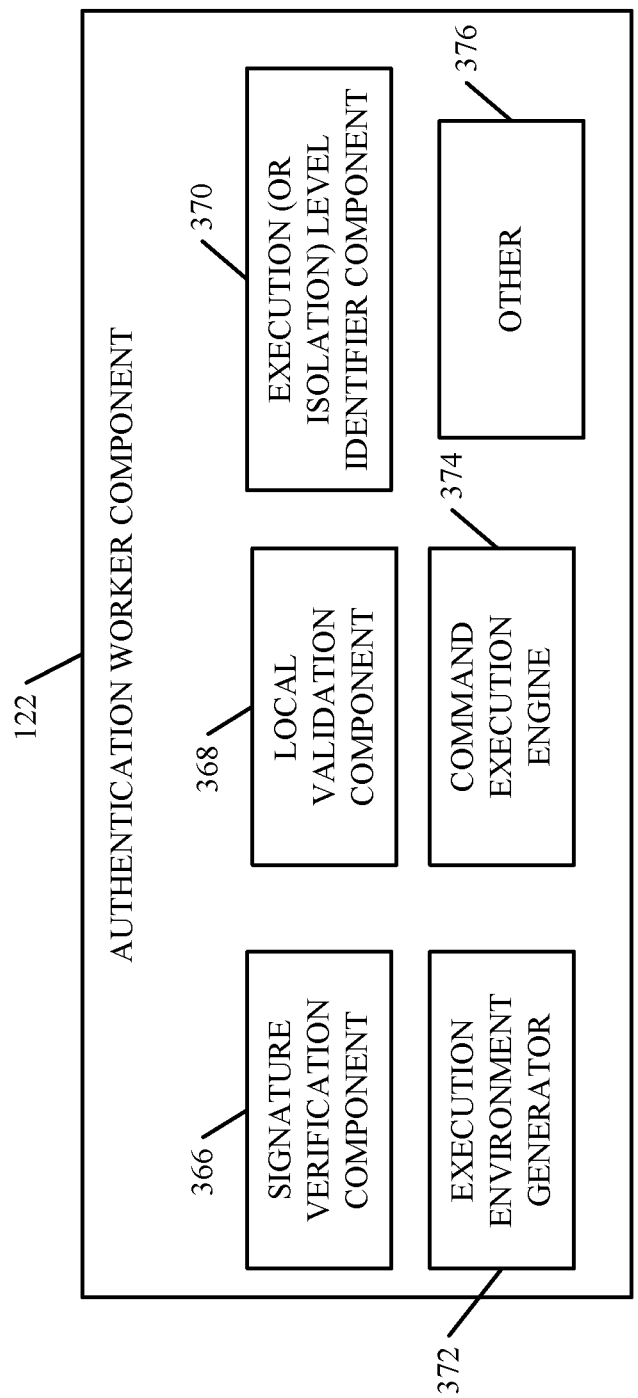

FIG. 4G shows one example of authentication worker component 122 in more detail. Component 122 can include, for instance, signature verification component 366, local validation component 368, execution (or isolation) level identifier component 370, execution environment generator 372, command execution engine 374, and it can include other items 376. FIGS. 1A, 1B, 4 and 4D-4G will now be described in conjunction with one another.

Again, FIGS. 4A-4C (collectively referred to herein as FIG. 4) illustrate a flow diagram showing one example of the operation of architecture 100 in allowing user 112 to perform a command on a target machine in multi-tenant management system 116. The same type of process can be carried out with respect to user 112 performing a command or an operation on a target machine in multi-tenant capacity system 140 as well, and the description in FIG. 4 is provided by way of example only. It is also assumed, for the sake of the description of FIG. 4, that trust, authentication and authorization system 156 is provided with the public key infrastructure 332 shown in FIG. 4D.

User 112 first launches a client console (or authentication front-end 186) on client system 106. This is indicated by block 380 in FIG. 4. User 112 then illustratively authenticates to AP system 104 using two-factor authentication. This is indicated by block 382. By way of example, authentication front-end 186 illustratively checks to ensure that user 112 has a user access request signing certificate. This can be stored in user access accounts 178 in access management system 162. This is indicated by block 384.

If the user does not have a user access signing certificate (a UA signing certificate), then authentication front-end 186 requests one. In doing so, authentication front-end 186 illustratively creates a public/private key pair, and, with that key pair, creates a request for a UA signing certificate. This is indicated by blocks 386 and 388 in FIG. 4. It then sends the request to an issuing certificate authority (such as certificate component 336 in public key infrastructure 332 shown in FIG. 4D). This is indicated by block 390. Certificate component 336 issues a UA signing certificate in response to the request. This is indicated by block 392. This can be done in a variety of different ways as well. For instance, certificate component 336 can verify that the user is a member of a given group, using role-based access control and interface system 164, or using user access accounts 178 or server access accounts 180, through identity management system 166, or in other ways. This is indicated by blocks 394 and 396, respectively.

If, at block 384, it is determined that the user has a UA signing certificate, or, after block 392 when the UA signing certificate is issued for the user, user 112 can then submit an access request (e.g., a command) that the user wishes to perform on the target machine 118 in multi-tenant management system 116, to MAFE system 126. In doing so, authentication front-end 186 (or the authentication client console) uses the UA request signing certificate to sign the request. This is indicated by block 398 in FIG. 4. The signed request includes the user request 400 that identifies the particular command that the user is requesting to perform. It also illustratively includes a digital signature of the request which can include both a one-way hash of the user request and a copy of the UA request singing certificate that was issued to the user. This is indicated by block 402. Of course, it can include other items as well, as indicated by block 404.

Verification component 348, in MAFE system 126 (shown in FIG. 4E), then uses the UA request signing certificate included in the request to verify the client signature. This is indicated by block 406. Verification component 348 can do this because the public key contained in the UA request signing certificate successfully re-computes the one-way hash function of the access request. Thus, for example, key component 342 obtains the public key from the UA request signing certificate. This is indicated by block 308. Hash function engine 344 then computes the one-way hash to obtain the access request data (e.g., the data that represents the command) This is indicated by block 410. Since the user's UA request signing certificate, itself, is signed by the issuing certificate authority (e.g., certificate component 336 in trust, authentication and authorization system 156, as shown in FIG. 4D), verification component 348 verifies the issuing certificate chain to see that the issuing certificate authority (certificate component 336) is trusted. This is indicated by block 412. MAFE system 126 can verify the client signature in other ways as well, and this is indicated by block 414.

Signature component 350 in MAFE system 126 then uses a MAFE access request signing certificate to sign the user access request. This is indicated by block 416.

Queue routing component 354, in MAFE system 126 then places the signed request (e.g., also referred to herein as a workflow blob) in request queue 130. This is indicated by block 418 in FIG. 4. CRQS system 128 then retrieves the signed request from queue 130 and sends it to the capability token service 182 in the AP system 104. This is indicated by block 420 in FIG. 4. Signature verification engine 358 (FIG. 4F) in capability token service 182 verifies the signature of MAFE system 126 and the user signature (or the signature of client system 106) and verifies that the user 112 is authorized to perform the workflow. Signing component 360 then signs it with a capability token (CT) service signing certificate, and workflow package generator 362 generates a new, approved workflow and places the new, approved workflow in approved request queue 132. This is indicated by block 422 in FIG. 4.

In one example, the workflow blob identifies the user making the request, the requested actions corresponding to the command, and the target resources upon which the command is to be performed. This is indicated by block 424. Capability token service 182 can access the role-based access control and interface system 164, as indicated by block 426. System 164 provides an indication as to whether the user is authorized to perform the command indicated by the workflow.

Capability token service 182 can also access role-requesting and approval system 158 to determine whether this user needs approval (such as from the user's manager) in order to perform the command. If so, it can carry out the approval process discussed above with respect to FIG. 2. This is indicated by block 428.

Once system 182 approves the workflow, this indicates that AP system 104 has authorized the workflow for the target resources on the target machine. This is indicated by block 430 in FIG. 4. The capability token service 182 can of course perform other actions as well, and this is indicated by block 432.

When the approved workflow surfaces in approved request queue 132, CRQS system 128 illustratively extracts it, breaks it down and distributes the new, approved workflow to the corresponding target machine 118 so that the command can be launched on that machine. This is indicated by block 434. The new, approved workflow is illustratively broken down into the set of tasks 436 that are to be performed on the target machine. It can also illustratively be broken down into the parameters that define the tasks, and the execution level or scope for each of the tasks. This is indicated by block 438. The breakdown can include other information 440 as well.

Authentication worker component 122 illustratively receives this broken down approved workflow on the target machine and accesses a root certificate authority certificate, that it has previously received, and verifies all of the signatures on the workload, and also locally validates the workflow using local policies 131 (or local policies 123 that are local to the machine 118). This is indicated by block 442. Recall that the workflow will illustratively include the signatures of the user (or client) 106, MAFE system 126 and the capability token service 182. This is indicated by block 444. Thus, signature verification component 366 in authentication worker component 122 verifies the signatures. Local validation component 368 can access the local policies 123 to determine whether AP system 104 is authorized to authenticate this user for this command on these target resources. It can also validate the various tasks in the command as well, and one example of this is described below with respect to FIG. 6. Of course, it can perform other actions as well, and this is indicated by block 446.

If the signatures or workflow are invalid, as determined at block 448, then a suitable error message can be displayed as indicated by block 450. However, if the signatures and workflow are valid, then processing continues at block 452.

Execution (or isolation) level identifier component 370 then identifies the execution level (or isolation level) for the workflow to operate in, in order to accomplish the command. In one example, it accesses local policies 131 (or 123). The local policies illustratively include a map between various individual commands and the execution level (or isolation level needed to perform the command). For instance, the map may include a mapping between a command and set of permissions or privileges needed to perform the command or the various tasks in the command Identifying the execution level (or isolation level) is indicated by block 452.

Authentication worker component 122 then uses execution environment generator 372 to open an execution environment with the least privileges (or at least the task-based privileges) needed to accommodate the execution level (or isolation level) that is used to perform the workflow corresponding to the command. This is indicated by block 454. Command execution engine 374 then executes the workflow in the least privileged execution environment, as indicated by block 456. In one example, component 122 returns the results of the executed command. This is indicated by block 458.

Figure 5:
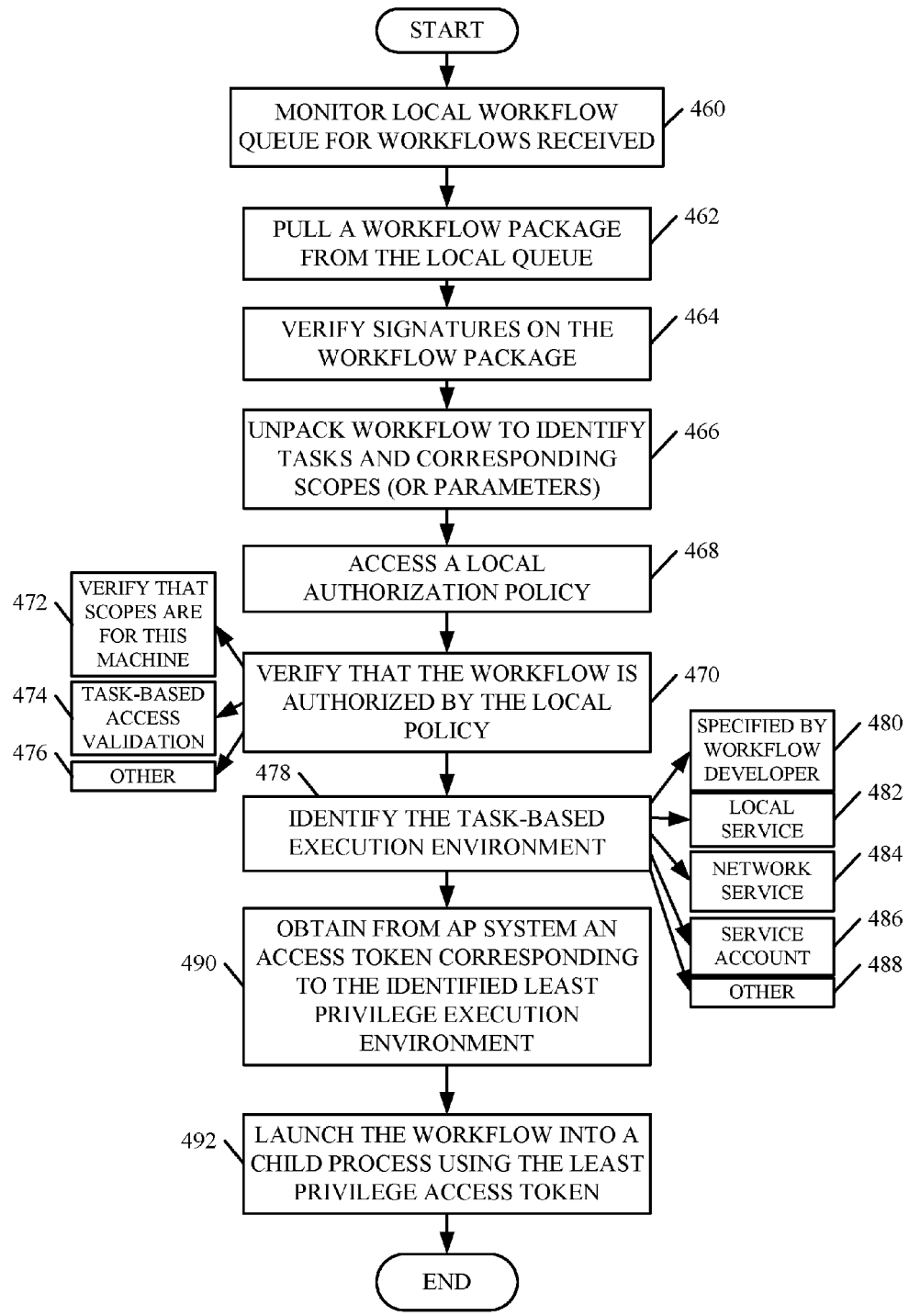
FIG. 5 is a flow diagram illustrating one example of the operation of an authorization worker component in a capacity machine, in performing a command or workflow.

FIG. 5 is a flow diagram illustrating one example of the operation of authentication worker component 122 in more detail. In one example, the various workflows that are to be performed on the target machine 118 are stored in a queue, and are executed in order. Therefore, authentication worker component 122 monitors the local workflow queue for workflows that are received. This is indicated by block 460. It then pulls a workflow package from the local queue, as indicated by block 462, and signature verification component 366 verifies the signatures on the workflow package.

Component 122 then unpacks the workflow to identify the various tasks and corresponding scopes (or parameters) for those tasks. This is indicated by block 466. For instance, a given workflow may comprise multiple lower level commands or tasks and may imply execution across different machines and different roles. Each task may be applicable on only some of the machine roles in the specified scope. A scope, for instance, may be a combination of one or more parameters that define a system, a tenant, a site, etc., for which a command request is being submitted. Local validation component 368 then accesses a local authorization policy and verifies that the workflow is authorized by the local policy. This is indicated by blocks 468 and 470. As one example, the authorization policy may map different scopes to different machines. Therefore, local validation component 368 may verify that the scopes are for the present target machine. This is indicated by block 472. Component 368 can also perform task-based access validation (which is described in greater detail below with respect to FIG. 6). This is indicated by block 474. Further, it can verify that the workflow is authorized by the local policy in other ways as well, and this is indicated by block 476.

Execution level identifier component 370 then identifies the task-based execution environment. In one example, this is the least privileged environment that is needed to perform the various tasks in the command or other request. In another example, the privileges are divided into groups, and it is the group of privileges that renders the system least accessible, but still enables the tasks to be performed. While this may not technically be the "least privileged" execution environment, it is one that is limited based on the tasks to be performed. This is indicated by block 478. Again, this can be done in a number of ways. For instance, the execution environment may be specified by the workflow developer, as indicated by block 480. It may be confined to a local service as indicated by block 482. It may be confined to a network service as indicated by 484, or it may be identified based on a particular service account, as indicated by block 486. It can be identified in other ways as well, and this is indicated by block 488.

Execution environment generator 372 then generates the execution environment needed to perform the command or set of tasks. In one example, it obtains from the AP system 104, an access token corresponding to the identified, least privileged execution environment. This is indicated by block 490. Command execution engine 374 then launches the workflow into a child process using the least privileged access token. This is indicated by block 492.

Figure 6A:
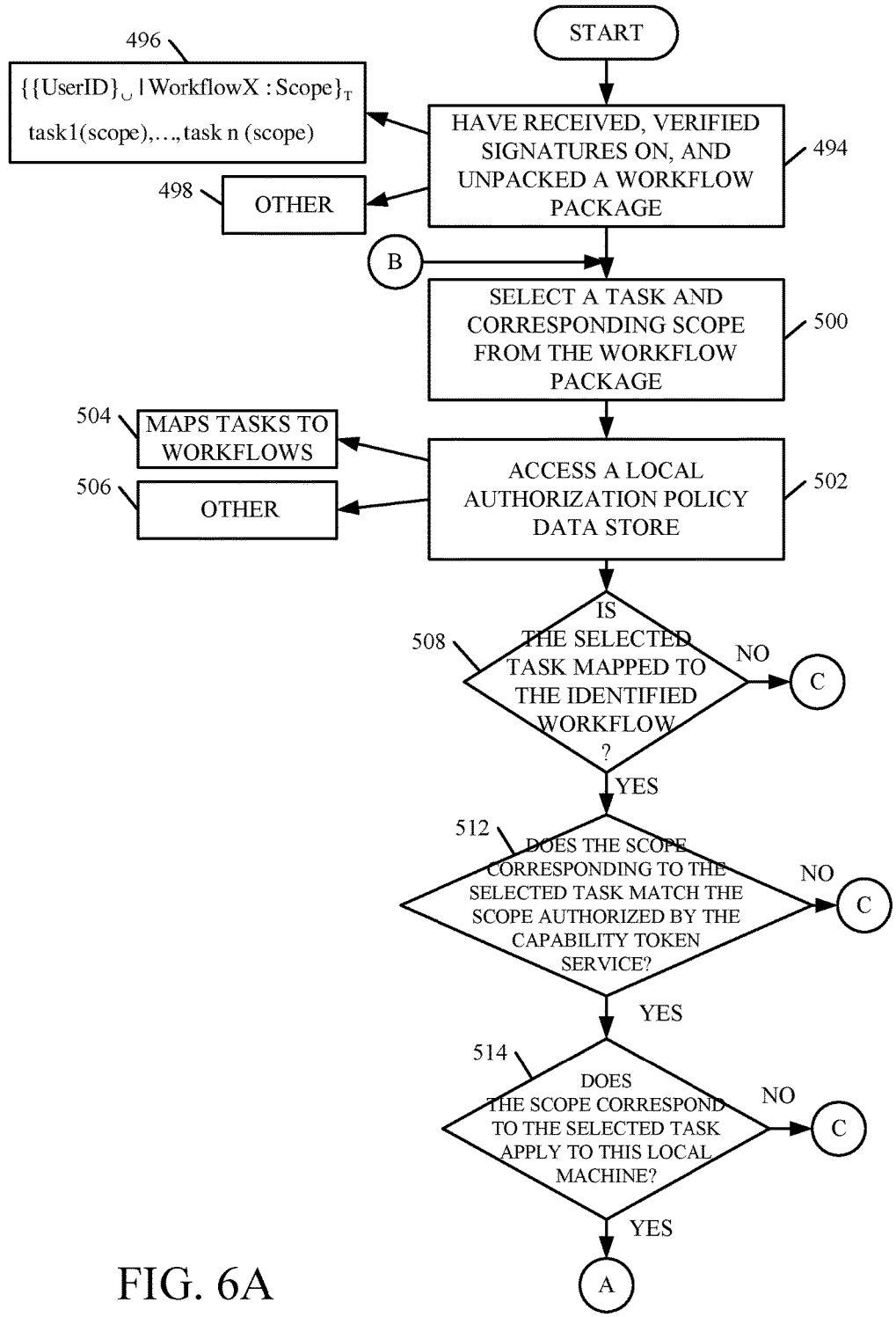
FIGS. 6A and 6B (collectively referred to herein as FIG. 6) are a flow diagram illustrating one example of the operation of an authorization worker component on a capacity machine in performing task-based access validation.
Figure 6B:
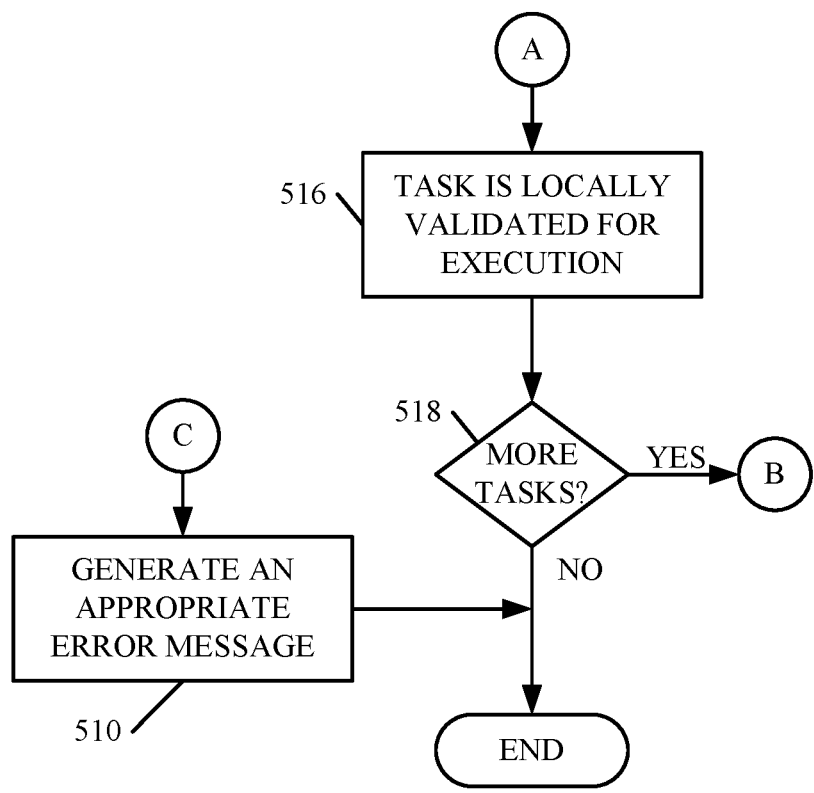

FIGS. 6A and 6B (collectively referred to herein as FIG. 6) illustrate one example of the operation of authentication worker component 122 in performing task-based access validation. This is also represented by block 474 in FIG. 5 above.

Recall that the authorization statements (or authorized command requests) received from AP system 104 are signed messages that contain a user (or client) signed identifier of the user and a workflow identifier that identifies the workflow and target scope on which the workflow is to be executed. When AP system 104 authorizes the workflow, it does so based on the user's role membership, the scopes associated with the user role membership, and the completion of a manager approval workflow, if needed. A given workflow may include multiple lower level commands or tasks, and may imply execution across different machines and different roles.

The authorization statements received from AP system 104 are illustratively high-level authorizations of the workflow in the scope identified by the user. However, these statements do not provide task-level access validation on each target machine. Because of the distributed authorization design of architecture 100, CRQS 128 does not have the power to authorize the execution of the workflows. Therefore, authorization worker component 122, on the target machine, performs the authorization of each of the tasks prior to its execution. Authentication worker component 122 can do this because when it receives a work item from CRQS 128, system 128 has broken the workflow down into the required tasks and parameters (or scopes) for those tasks. The local validation component 368 on authentication worker component 122 authorizes the tasks. This can be verifying that the task and scope are part of the workflow, and that the scope authorized by AP system 104 corresponds to the target machine. To do this, local validation component 368 in authentication worker component 122 checks each task against the local authorization policy 123, which includes a mapping of each workflow to the corresponding tasks.

In general, AP system 104 issues a set of claims including the user identified workflow and the user identified scope. When verifying that a workload contains a specified task, CRQS 128 queries a local authorization policy 131 to see if the workflow includes the specified task. When verifying the scope of the task, authentication worker component 122 verifies that the scope provided by CRQS 128 matches that of the claim approved by AP system 104, and also verifies that the specified scope actually includes the local machine (or target machine) 118. FIGS. 6A and 6B (collectively referred to herein as FIG. 6) illustrate this operation in more detail.

It is first assumed that authentication worker component 122 has received, verified signatures on, and unpacked a workflow package. This is indicated by block 494 in FIG. 6. In one example, a given user identified by a user ID requests a workflow X that has a given scope over a set of tasks T. Each task has a corresponding task scope. This can be represented as shown at 496. Of course, it can be represented in other ways 498 as well.

Local validation component 368 first selects a task and corresponding scope from the workflow package. This is indicated by block 500. It then accesses a local authorization policy data store (such as local policies 123). This is indicated by block 502. Local policies 123 illustratively map tasks to workflows. This is indicated by block 504. It may include other information as well as indicated by block 506. Local validation component 368 then determines whether the selected task is mapped to the identified workflow indicated at 496. This determination is indicated by block 508 in FIG. 6. If not, an appropriate error message is generated as indicated by block 510. However, if so, then local validation component 368 determines whether the scope corresponding to the selected task matches the scope authorized by the capability token service 182. This is indicated by block 512. If so, local validation component 368 then determines whether the scope corresponding to the selected task applies to this particular local machine (e.g., machine 118). This is indicated by block 514. If the answer at either of blocks 512 or 514 is no, then processing again reverts to block 510 where an appropriate error message is generated. However, if the answer at each bock is yes, then the task has been locally validated for execution on this particular target machine. This is indicated by block 516. Local validation component 368 then determines, at block 518, whether there are any additional tasks to process in the workflow indicated by block 496. If so, processing reverts to block 500. If not, all tasks have been validated for this machine.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 7:
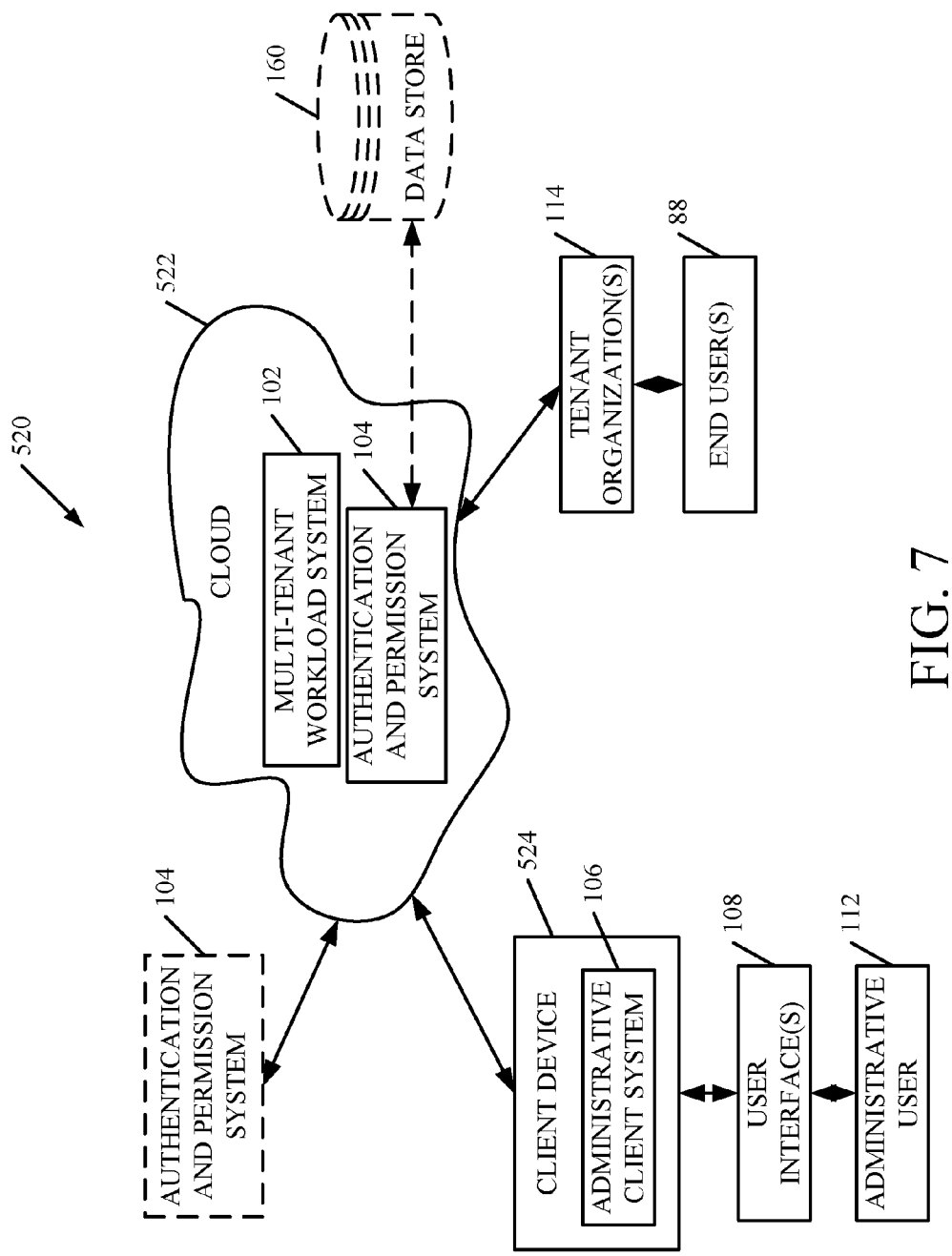
FIG. 7 is a block diagram showing one example of the architecture illustrated in FIG. 1, deployed in a cloud computing architecture.

FIG. 7 is a block diagram of architecture 100, shown in FIG. 1A, except that its elements are disposed in a cloud computing architecture 520. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1A and they are similarly numbered. FIG. 7 specifically shows that multi-tenant workload system 102 and authentication and permission system 104 can be located in cloud 522 (which can be public, private, or a combination where portions are public while others are private). Therefore, user 112 uses a user device 524 to access those systems through cloud 522.

FIG. 7 also depicts another example of a cloud architecture. FIG. 7 shows that it is also contemplated that some elements of architecture 100 can be disposed in cloud 522 while others are not. By way of example, data store 160 can be disposed outside of cloud 522, and accessed through cloud 522. In another example, AP system 104 can also be outside of cloud 252. Regardless of where they are located, they can be accessed directly by device 524, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
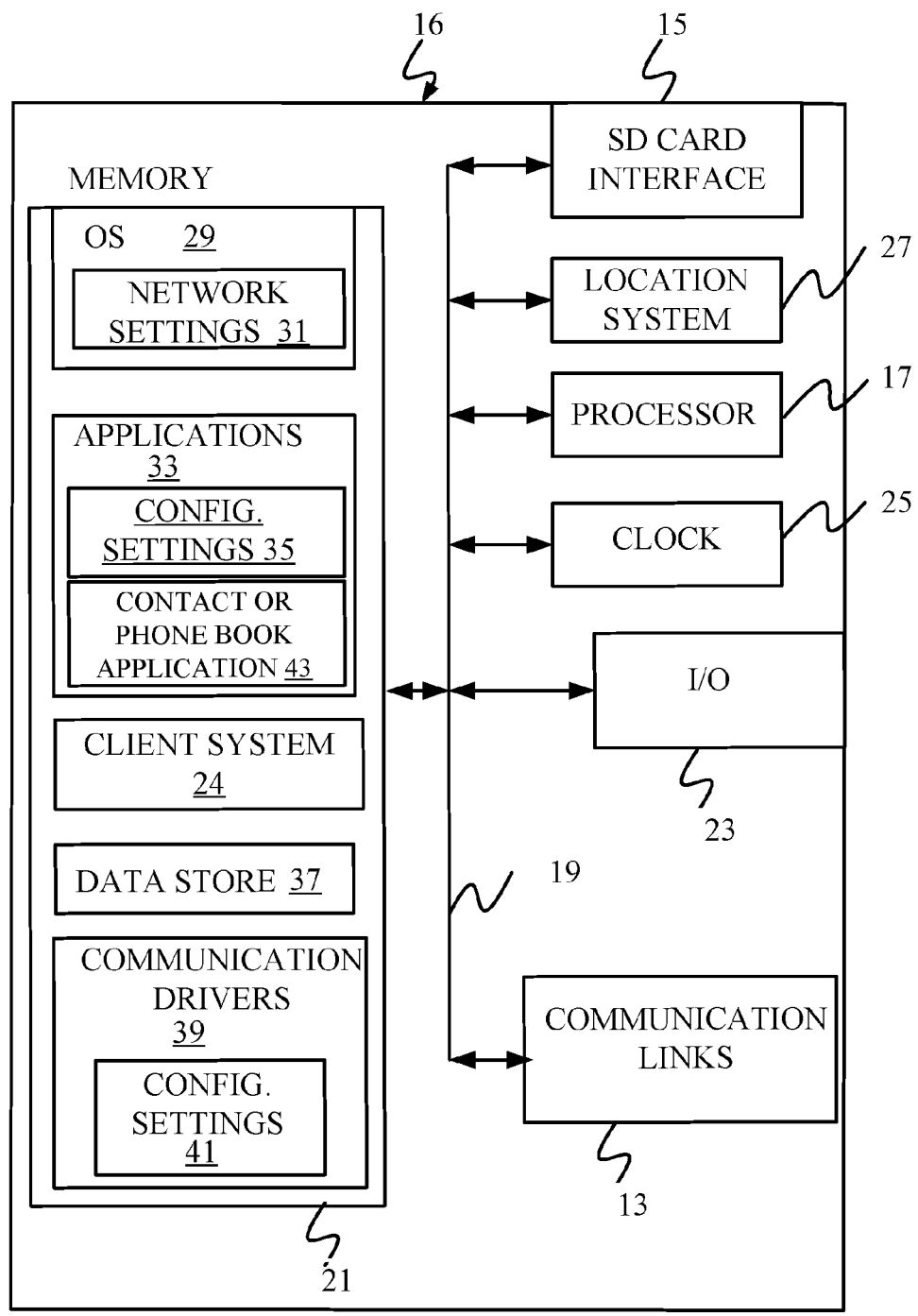
FIGS. 8-10 show various examples of mobile devices that can be used in the architectures discussed in the previous figures.
Figure 9:
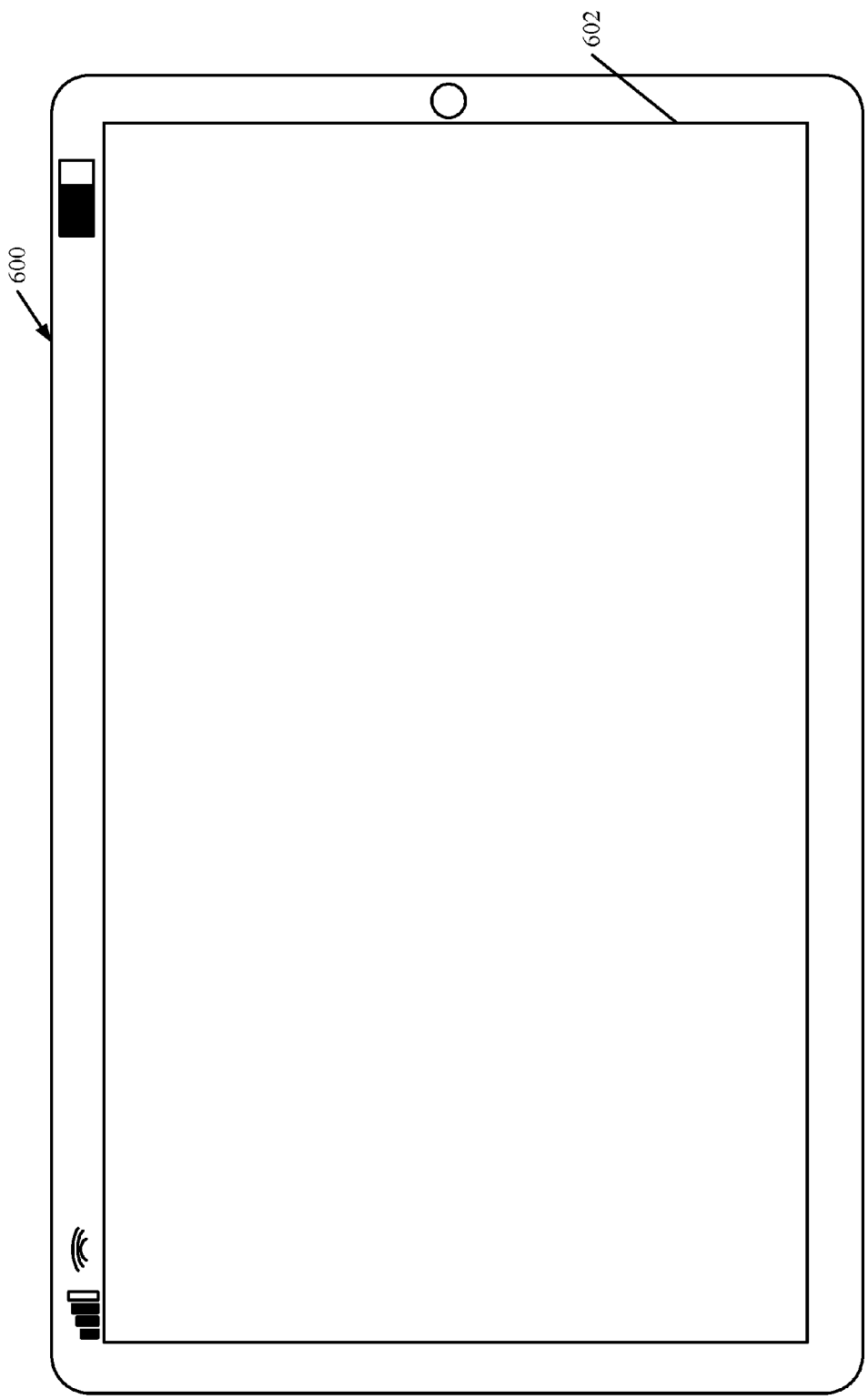
Figure 10:
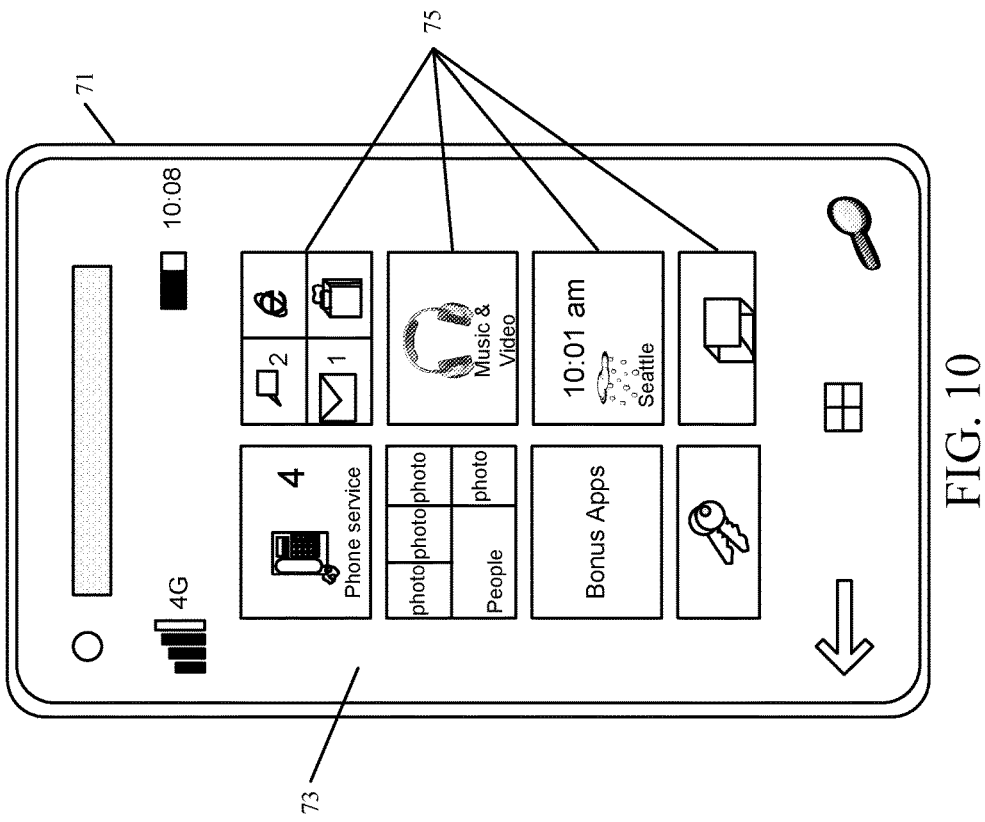

FIG. 8 is a simplified block diagram of one illustrative embodiment of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components of data center 102 or AP system 104 or administrative client system 106 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

Under other examples, applications or systems are received on a removable Secure Digital (SD) card that is connected to a SD card interface 15. SD card interface 15 and communication links 13 communicate with a processor 17 (which can also embody processors from FIG. 1A) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of tenant 114, or administrative client 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can also be used. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone includes an antenna for receiving cellular phone signals such as General Packet Radio Service (GPRS) and 1xrtt, and Short Message Service (SMS) signals. In some examples, the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 10 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
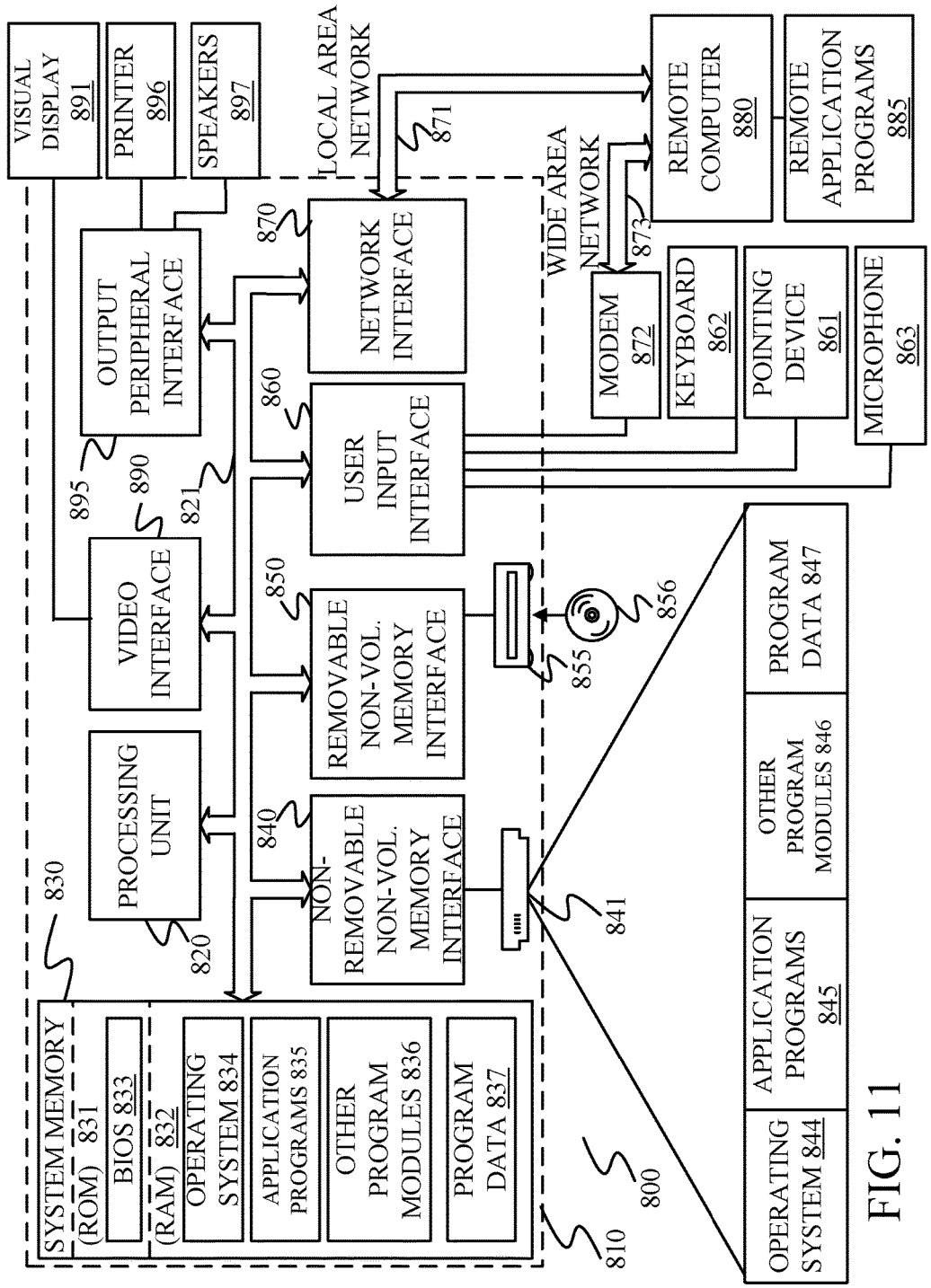
FIG. 11 is a block diagram of one example of a computing environment that can be used in various parts of the architectures set out in the previous figures.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise any of the processors discussed above), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1A can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a permission computing system, comprising:

a signature verification engine that receives a signed user access request, the user access request identifying a user and requesting access to a target resource on a target machine in a remote multi-tenant capacity system to perform a workflow on the target resource and being received from a remote multi-tenant management system, the signature verification engine verifying a first signature on the user access request as belonging to the multi-tenant management system;

a set of user access accounts;

a role-based access control system that accesses the user access accounts and verifies that the user is authorized to perform the workflow; and a capability token service that, based at least in part on the signature verification engine verifying the first signature and the role-based access control system verifying that the user is authorized to perform the workflow, generates an output package based on the user access request.

Example 2 is the permission computing system of any or all previous examples wherein the user access request is further signed by a remote client system corresponding to the user and wherein the signature verification system verifies a second signature as belonging to the remote client system.

Example 3 is the permission computing system of any or all previous examples wherein the capability token service further comprising:

a signing component that, in response to the signature verification engine verifying the first and second signatures and the role-based access control system verifying that the user is authorized to perform the workflow, signing the workflow with a service component signing certificate.

Example 4 is the permission computing system of any or all previous examples wherein the capability token service comprises:

a workflow package generator that generates an approved workflow package indicating that the permission computing system has authorized the user to access the target resource on the target machine to perform the workflow.

Example 5 is the permission computing system of any or all previous examples wherein the workflow package generator outputs the approved workflow package to an approved request queue in the remote multi-tenant management system.

Example 6 is the permission computing system of any or all previous examples and further comprising:

an approval requesting system that identifies whether the user needs approval from another user to perform the workflow.

Example 7 is the permission computing system of any or all previous examples wherein the remote client system signs the user access request with a user access signing certificate, and further comprising:

a certificate component that receives a request for a user access signing certificate and verifies that the corresponding user is a member of a given group that is authorized to receive a user access signing certificate and, if so, returns the user access signing certificate to the remote client system in response to the request for the user access signing certificate.

Example 8 is the permission computing system of any or all previous examples wherein the request for the user access signing certificate is encrypted with a key in a public/private key pair, and further comprising:

a key component that uses at least one key in the public/private key pair to decrypt the request for the user access signing certificate.

Example 9 is the permission computing system of any or all previous examples and further comprising:

an identity management system that accesses user access accounts and server access accounts to identify group membership information, the certificate component accessing the identity management system to determine whether the user corresponding to the remote client system is a member of the given group.

Example 10 is a computer implemented method, comprising:

receiving, at a permission computing system, a signed user access request, the user access request identifying a user and requesting access to a target resource on a target machine in a remote multi-tenant capacity system to perform a workflow on the target resource and being received from a remote multi-tenant management system;

verifying a first signature on the user access request as belonging to the multi-tenant management system;

accessing a user access account;

verifying that the user is authorized to perform the workflow based on the user access account; and generating, at least in part based on the verification of the first signature and the verification that the user is authorized to perform the workflow, an output package including a verification indicator and the workflow identified in the user access request.

Example 11 is the computer implemented method of any or all previous examples wherein the user access request is further signed by a remote client system corresponding to the user and further comprising:

verifying a second signature as belonging to the remote client system.

Example 12 is the computer implemented method of any or all previous examples and further comprising:

in response to verifying the first and second signatures and verifying that the user is authorized to perform the workflow, signing the workflow with a signing certificate.

Example 13 is the computer implemented method of any or all previous examples wherein generating the output package comprises:

generating an approved workflow package indicating that the permission computing system has authorized the user to access the target resource on the target machine to perform the workflow.

Example 14 is the computer implemented method of any or all previous examples wherein generating the approved workflow package comprises:

sending the approved workflow package to an approved request queue in the remote multi-tenant management system.

Example 15 is the computer implemented method of any or all previous examples wherein the remote client system signs the user access request with a user access signing certificate, and further comprising:

receiving a request, from the remote client system, for a user access signing certificate;

verifying that the corresponding user is a member of a given group that is authorized to receive a user access signing certificate; and if so, returning the user access signing certificate to the remote client system in response to the request for the user access signing certificate.

Example 16 is the computer implemented method of any or all previous examples wherein the request for the user access signing certificate is encrypted with a key in a public/private key pair, and further comprising:
using a key in the public/private key pair to decrypt the request for the user access signing certificate.

Example 17 is the computer implemented method of any or all previous examples wherein verifying that the corresponding user is a member of a given group comprises:
accessing user access accounts and server access accounts to identify group membership information, to determine whether the user corresponding to the remote client system is a member of the given group.

Example 18 is a computing system, comprising:
a signature verification engine that receives a signed user access request, the user access request identifying a user and requesting access to a target resource on a target machine in a remote multi-tenant capacity system to perform a workflow on the target resource and being received from a remote multi-tenant management system, the signature verification engine verifying a first signature on the user access request as belonging to the multi-tenant management system;
a set of user access accounts;
a role-based access control system that accesses the user access accounts and verifies that the user is authorized to perform the workflow; and
a workflow package generator that, based at least in part on the signature verification engine verifying the first signature and the role-based access control system verifying that the user is authorized to perform the workflow, generates an approved workflow package indicating that the computing system has authorized the user to access the target resource on the target machine to perform the workflow.

Example 19 is the computing system of any or all previous examples wherein the user access request is further signed by a remote client system corresponding to the user and wherein the signature verification system verifies a second signature as belonging to the remote client system, and further comprising:
a signing component that, in response to the signature verification engine verifying the first and second signatures and the role-based access control system verifying that the user is authorized to perform the workflow, signing the workflow with a service component signing certificate.

Example 20 is the computing system of any or all previous examples wherein the workflow package generator sends the approved workflow package to an approved request queue in the remote multi-tenant management system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A permission computing system, comprising:
a processor; and
memory storing instructions executable by the processor, wherein the instructions, when executed, configure the permission computing system to provide:
a signature verification engine configured to:
receive, from a remote multi-tenant management system, a signed user access request that is signed by a remote client system corresponding to a user, the user access request identifying the user and requesting access to a target resource on a target machine in a remote multi-tenant capacity system to perform a task on the target resource;
verify a first signature on the user access request as belonging to the multi-tenant management system and verify a second signature as belonging to the remote client system;
a set of user access accounts;
an approval requesting system configured to identify whether the user needs approval from another user to perform the task;
a role-based access control system configured to access the user access accounts and verify that the user is authorized to perform the task; and
a capability token service configured to:
based at least in part on the signature verification engine verifying the first and second signatures and the role-based access control system verifying that the user is authorized to perform the task,
sign the task with a service component signing certificate;
generate an approved task package indicating that the permission computing system has authorized the user to access the target resource on the target machine to perform the task; and
output the approved task package to an approved request queue in the remote multi-tenant management system.

2. The permission computing system of claim 1 wherein the remote client system signs the user access request with a user access signing certificate, and further comprising:
a certificate component configured to receive a request for a user access signing certificate and verify that the corresponding user is a member of a given group that is authorized to receive a user access signing certificate and, if so, return the user access signing certificate to the remote client system in response to the request for the user access signing certificate.

3. The permission computing system of claim 2 wherein the request for the user access signing certificate is encrypted with a key in a public/private key pair, and further comprising:
a key component configured to use at least one key in the public/private key pair to decrypt the request for the user access signing certificate.

4. The permission computing system of claim 2 and further comprising:
an identity management system configured to access user access accounts and server access accounts to identify group membership information, the certificate component configured to access the identity management system to determine whether the user corresponding to the remote client system is a member of the given group.

5. A computer implemented method, comprising:
receiving, at a permission computing system from a remote multi-tenant management system, a signed user access request that is signed by a remote client system corresponding to a user, the user access request identifying the user and requesting access to a target resource on a target machine in a remote multi-tenant capacity system to perform a task on the target resource;
verifying a first signature on the user access request as belonging to the multi-tenant management system;
verifying a second signature as belonging to the remote client system;

identifying whether the user needs approval from another user to perform the task;
accessing a user access account;
verifying that the user is authorized to perform the task based on the user access account; and
based at least in part on the verification of the first and second signatures and the verification that the user is authorized to perform the task,
  signing the task with a service component signing certificate;
  generating an approved task package indicating that the permission computing system has authorized the user to access the target resource on the target machine to perform the task; and
  output the approved task package to an approved request queue in the remote multi-tenant management system.

6. The computer implemented method of claim 5 wherein the remote client system signs the user access request with a user access signing certificate, and further comprising:
receiving a request, from the remote client system, for a user access signing certificate;
verifying that the corresponding user is a member of a given group that is authorized to receive a user access signing certificate; and
if so, returning the user access signing certificate to the remote client system in response to the request for the user access signing certificate.

7. The computer implemented method of claim 6 wherein the request for the user access signing certificate is encrypted with a key in a public/private key pair, and further comprising:
using a key in the public/private key pair to decrypt the request for the user access signing certificate.

8. The computer implemented method of claim 7 wherein verifying that the corresponding user is a member of a given group comprises:
accessing user access accounts and server access accounts to identify group membership information, to determine whether the user corresponding to the remote client system is a member of the given group.

* * * * *